US012699737B2

(12) United States Patent
Wu

(10) Patent No.: US 12,699,737 B2
(45) Date of Patent: Aug. 4, 2026

(54) APPLICATION RECOMMENDATION METHOD AND ELECTRONIC DEVICE

(71) Applicant: Huawei Technologies Co., Ltd., Shenzhen (CN)

(72) Inventor: Zhenyuan Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/835,889

(22) PCT Filed: Sep. 18, 2023

(86) PCT No.: PCT/CN2023/119453
§ 371 (c)(1),
(2) Date: Aug. 5, 2024

(87) PCT Pub. No.: WO2024/067216
PCT Pub. Date: Apr. 4, 2024

(65) Prior Publication Data
US 2025/0148017 A1 May 8, 2025

(30) Foreign Application Priority Data

Sep. 30, 2022 (CN) .......................... 202211209032.3

(51) Int. Cl.
*G06F 16/904* (2019.01)
*G06F 3/04817* (2022.01)
(Continued)

(52) U.S. Cl.
CPC ........ *G06F 16/904* (2019.01); *G06F 3/04817* (2013.01); *G06F 8/61* (2013.01); *G06F 8/65* (2013.01)

(58) Field of Classification Search
CPC .......................... G06F 16/904; G06F 3/04817
See application file for complete search history.

(56) References Cited

U.S. PATENT DOCUMENTS

2012/0316955 A1* 12/2012 Panguluri .............. G06Q 30/06
707/706
2014/0012574 A1* 1/2014 Pasupalak ............. G06F 16/243
704/235

(Continued)

FOREIGN PATENT DOCUMENTS

CN 102016849 A 4/2011
CN 102158593 A 8/2011
(Continued)

OTHER PUBLICATIONS

Alex Austin: "How to Set Up An iOS and Android Smart App Banner—Branch", Mar. 30, 2022, XP093312278, total 6 pages. Retrieved from the Internet: URL: <https://www.branch.io/resources/blog/how-to-setup-an-ios-and-android-smart-app-banner-with-deep-linking-and-download-tracking/>.

(Continued)

*Primary Examiner* — Courtney Harmon
(74) *Attorney, Agent, or Firm* — Conley Rose, P.C.

(57) ABSTRACT

An application recommendation method includes: receiving search content input on a first interface of an application market application; and displaying a second interface of the application market application in response to the search content, where the second interface includes a first tag type, a second tag type, first application information, and second application information, the first application information includes a name and an icon of a first application, the second application information includes a name and an icon of a second application, a tag type of the first application is the first tag type, a tag type of the second application is the second tag type, and the first tag type is different from the second tag type.

20 Claims, 15 Drawing Sheets

(51) Int. Cl.
    *G06F 8/61*         (2018.01)
    *G06F 8/65*         (2018.01)

(56)             References Cited

U.S. PATENT DOCUMENTS

| | | | | |
|---|---|---|---|---|
| 2014/0032572 A1* | 1/2014 | Eustice | .................. | G06N 20/00 |
| | | | | 707/736 |
| 2016/0125080 A1* | 5/2016 | Glover | .................. | G06F 16/951 |
| | | | | 707/706 |
| 2016/0171589 A1 | 6/2016 | Glover | | |
| 2016/0299977 A1 | 10/2016 | Hreha | | |
| 2019/0370345 A1 | 12/2019 | Katukuri et al. | | |
| 2022/0365740 A1* | 11/2022 | Chang | .................. | G06F 3/1454 |
| 2022/0394349 A1* | 12/2022 | Sanders | ................ | G06F 21/604 |

FOREIGN PATENT DOCUMENTS

| | | | |
|---|---|---|---|
| CN | 103699619 | A | 4/2014 |
| CN | 106066878 | A | 11/2016 |
| CN | 106897412 | A | 6/2017 |
| CN | 113505296 | A | 10/2021 |
| KR | 101995260 | B1 | 7/2019 |
| WO | 2011064675 | A1 | 6/2011 |
| WO | 2013169245 | A2 | 11/2013 |

OTHER PUBLICATIONS

Phemy Smith: "Smart app banner. About | by Phemy smith | Medium", Apr. 1, 2021, XP093312276, total 12 pages. Retrieved from the Internet: URL: <https://phemy-smith.medium. com/smart-app-banner-445993699dc2>.

Ye Lin et al., "A Basic Tutorial on jQuery Development Based on New Information Technologies," Jan. 31, 2021, total 14 pages.

Miya Liu, "How to Build a Accordian Menu Using HTML, CSS and JavaScript," Sep. 30, 2021, total 24 pages.

* cited by examiner

Communication system 10

Electronic
device 100

Server 200

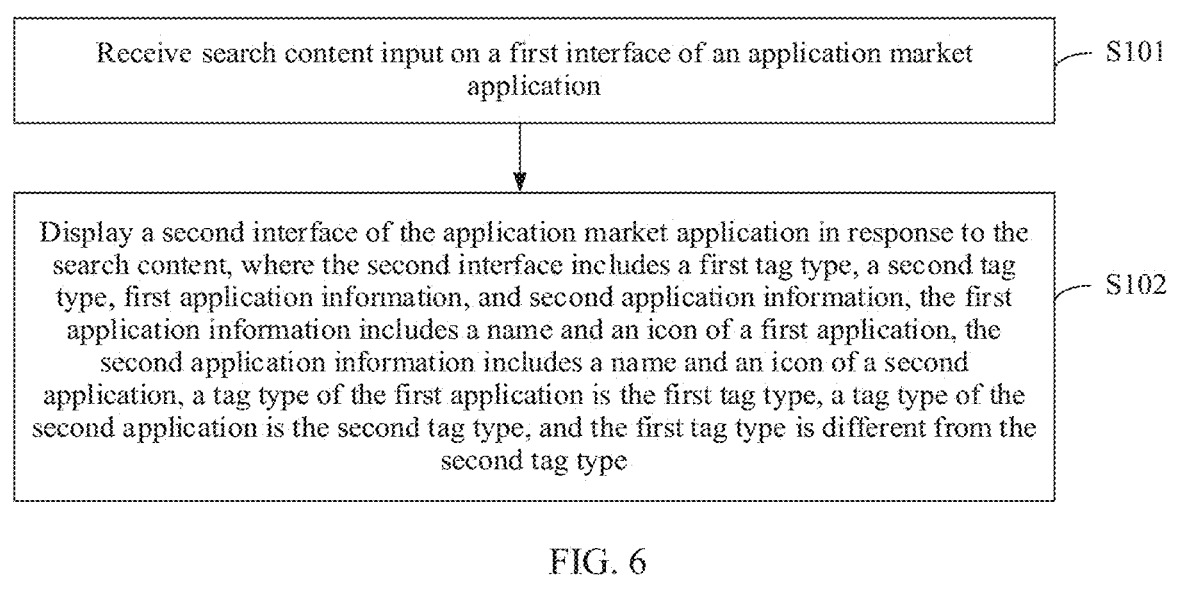

Receive search content input on a first interface of an application market application — S101

Display a second interface of the application market application in response to the search content, where the second interface includes a first tag type, a second tag type, first application information, and second application information, the first application information includes a name and an icon of a first application, the second application information includes a name and an icon of a second application, a tag type of the first application is the first tag type, a tag type of the second application is the second tag type, and the first tag type is different from the second tag type — S102

FIG. 6

APPLICATION RECOMMENDATION METHOD AND ELECTRONIC DEVICE

CROSS-REFERENCE TO RELATED APPLICATIONS

This is a National Stage of International Patent Application No. PCT/CN2023/119453 filed on Sep. 18, 2023, which claims priority to Chinese Patent Application No. 202211209032.3 filed on Sep. 30, 2022. Both of the aforementioned applications are hereby incorporated by reference in their entireties.

TECHNICAL FIELD

This application relates to the field of terminal technologies, and in particular, to an application recommendation method and an electronic device.

BACKGROUND

With performance improvement of electronic devices, applications (applications, APPs) of categories such as news, books, and entertainment emerge in the market. Various types of applications and complex functions bring difficulties to a user in search.

Currently, each time after the user performs search, an electronic device may display related applications in a tiled manner. After the user browses a specific application, the electronic device returns to a search start page, and the user needs to search for a related application again.

However, the foregoing repeated search process causes poor user search experience, and it is inconvenient for the user to query an application that the user is interested in, resulting in a poor recommendation effect of the electronic device.

SUMMARY

This application provides an application recommendation method and an electronic device, to recommend applications in a clustered manner based on a plurality of tag types, so that a user can quickly find an application that the user is interested in.

According to a first aspect, this application provides an application recommendation method, applied to an electronic device. The method includes:

receiving search content input on a first interface of an application market application: and displaying a second interface of the application market application in response to the search content, where the second interface includes a first tag type, a second tag type, first application information, and second application information, the first application information includes a name and an icon of a first application, the second application information includes a name and an icon of a second application, a tag type of the first application is the first tag type, a tag type of the second application is the second tag type, and the first tag type is different from the second tag type.

According to the application recommendation method provided in the first aspect, the electronic device receives the search content input on the first interface of the application market application. The first tag type, the second tag type, the name and the icon of the first application corresponding to the first tag type, and the name and the icon of the second application corresponding to the second tag type may be displayed based on an association relationship between the search content and an application and/or a tag type. In this way, a user can hierarchically view applications of a plurality of tag types, to help attract the user to continue to view or download an application. Further, the user can compare the applications of the plurality of tag types, to help the user accurately distinguish between the applications and make quick selection. This improves user retrieval experience of application recommendation, and increases a conversion rate of application recommendation.

In addition, an application related to the search content may be further accurately recommended. This improves correlation of application recommendation, reduces probability of recommending an application unrelated to the search content, increases a query quantity, a click-through rate, and a download quantity of the recommended application, and brings better recommendation experience to the user.

The application market application may be replaced with a web page version of the application market and/or an application market official account. For ease of description, the application market application is used as an example for illustration in this application.

In a possible design, the foregoing association relationship may be understood as that the first tag type and/or the second tag type are/is related to the search content, and/or the first application information and the second application information are related to the search content.

In a possible design, the method further includes:

receiving a first operation performed on the first application information on the second interface, and displaying a third interface of the application market application in response to the first operation, where the third interface includes details about the first application, the first tag type, the second tag type, third application information, and the second application information, the third application information includes a name and an icon of a third application, and a tag type of the third application is the first tag type.

In this way, after receiving an operation of viewing any application in the first tag type on the second interface, the electronic device may display, on the third interface, details about the application, the first tag type, the second tag type, and names and icons of one or more applications corresponding to each tag type.

In a possible design, the third interface further includes fourth application information, the fourth application information includes a name and an icon of a fourth application, and a tag type of the fourth application is the first tag type.

In a possible design, the third interface further includes fifth application information, the fifth application information includes a name and an icon of a fifth application, and a tag type of the fifth application is the second tag type.

In this case, parameters such as a quantity of tag types, a type of a tag type, and a quantity and types of applications corresponding to any tag type that are displayed on the third interface may be the same as or different from those displayed on the second interface. In addition, the foregoing parameters may be displayed in a same manner or different manners. In this way, interface display is enriched.

In a possible design, the method further includes:

receiving a second operation; and displaying a fourth interface of the application market application in response to the second operation, where the fourth interface includes details about the second application, the first tag type, the second tag type, the first application information, and sixth application information, the sixth application information includes a name and an icon of a sixth application, and a tag type of the sixth application is the second tag type.

In this way, after receiving the operation of viewing any application in the second tag type, the electronic device may display, on the third interface, details about the application, the first tag type, the second tag type, and names and icons of one or more applications corresponding to each tag type.

In a possible design, the second operation is an operation performed on the second application information on the second interface and/or the third interface.

In a possible design, the second interface, the third interface, and the fourth interface further include a third tag type and seventh application information, the seventh application information includes a name and an icon of a seventh application, and a tag type of the seventh application is the third tag type.

In a possible design.

sorting of the first tag type, the second tag type, and the third tag type on the second interface is first sorting, and the first sorting is that the first tag type is before the second tag type, and the second tag type is before the third tag type; and sorting of the first tag type, the second tag type, and the third tag type on the fourth interface is second sorting, and the second sorting is that the second tag type is before the first tag type, and the first tag type is before the third tag type.

In a possible design, sorting of the first tag type, the second tag type, and the third tag type on each of the second interface and the third interface is first sorting, and the first sorting is that the first tag type is before the second tag type, and the second tag type is before the third tag type.

In a possible design, sorting of each tag type is related to a historical operation behavior of each tag type.

In a possible design, the method further includes:

receiving a third operation performed on the first tag type; and displaying a fifth interface of the application market application in response to the third operation, where the fifth interface includes a first application recommendation list, the first application recommendation list includes a plurality of applications, and a tag type of each application is the first tag type.

In this way, after receiving an operation of viewing any tag type on any one of the second interface, the third interface, or the fourth interface, the electronic device may display, on the fifth interface, a plurality of applications corresponding to the tag type.

In a possible design, the fifth interface further includes the first tag type and the second tag type.

In a possible design, the first application information further includes a control of the first application. The method further includes:

receiving a fourth operation performed on the control of the first application; and installing or updating the first application on the electronic device in response to the fourth operation.

In a possible design, the displaying a second interface of the application market application in response to the search content includes:

sending the search content to a server;

receiving the first tag type, the second tag type, the first application information, and the second application information from the server; and displaying the first tag type, the second tag type, the first application information, and the second application information on the second interface.

In this way, the electronic device may display, on a result page of the search content by interacting with the server, a plurality of tag types and a name and an icon of an application of each tag type.

According to a second aspect, this application provides an application recommendation apparatus, including a module configured to perform the application recommendation method according to any one of the first aspect and the possible designs of the first aspect.

According to a third aspect, this application provides an electronic device, including a memory and a processor. The memory is configured to store program instructions, and the processor is configured to invoke the program instructions in the memory, so that the electronic device performs the application recommendation method according to any one of the first aspect and the possible designs of the first aspect.

According to a fourth aspect, this application provides a chip system. The chip system is applied to an electronic device including a memory, a display, and a sensor. The chip system includes a processor. When the processor executes computer instructions stored in the memory, the electronic device performs the application recommendation method according to any one of the first aspect and the possible designs of the first aspect.

According to a fifth aspect, this application provides a computer-readable storage medium. The computer-readable storage medium stores a computer program. When the computer program is executed by a processor, an electronic device is enabled to implement the application recommendation method according to any one of the first aspect and the possible designs of the first aspect.

According to a sixth aspect, this application provides a computer program product, including executable instructions. The executable instructions are stored in a readable storage medium. At least one processor of an electronic device may read the executable instructions from the readable storage medium, and the at least one processor executes the executable instructions, so that the electronic device implements the application recommendation method according to any one of the first aspect and the possible designs of the first aspect.

BRIEF DESCRIPTION OF DRAWINGS

FIG. 3A to FIG. 3I are schematic diagrams of human-machine interaction interfaces according to an embodiment of this application.

FIG. 6 is a schematic flowchart of an application recommendation method according to this application.

DESCRIPTION OF EMBODIMENTS

Figure 1:
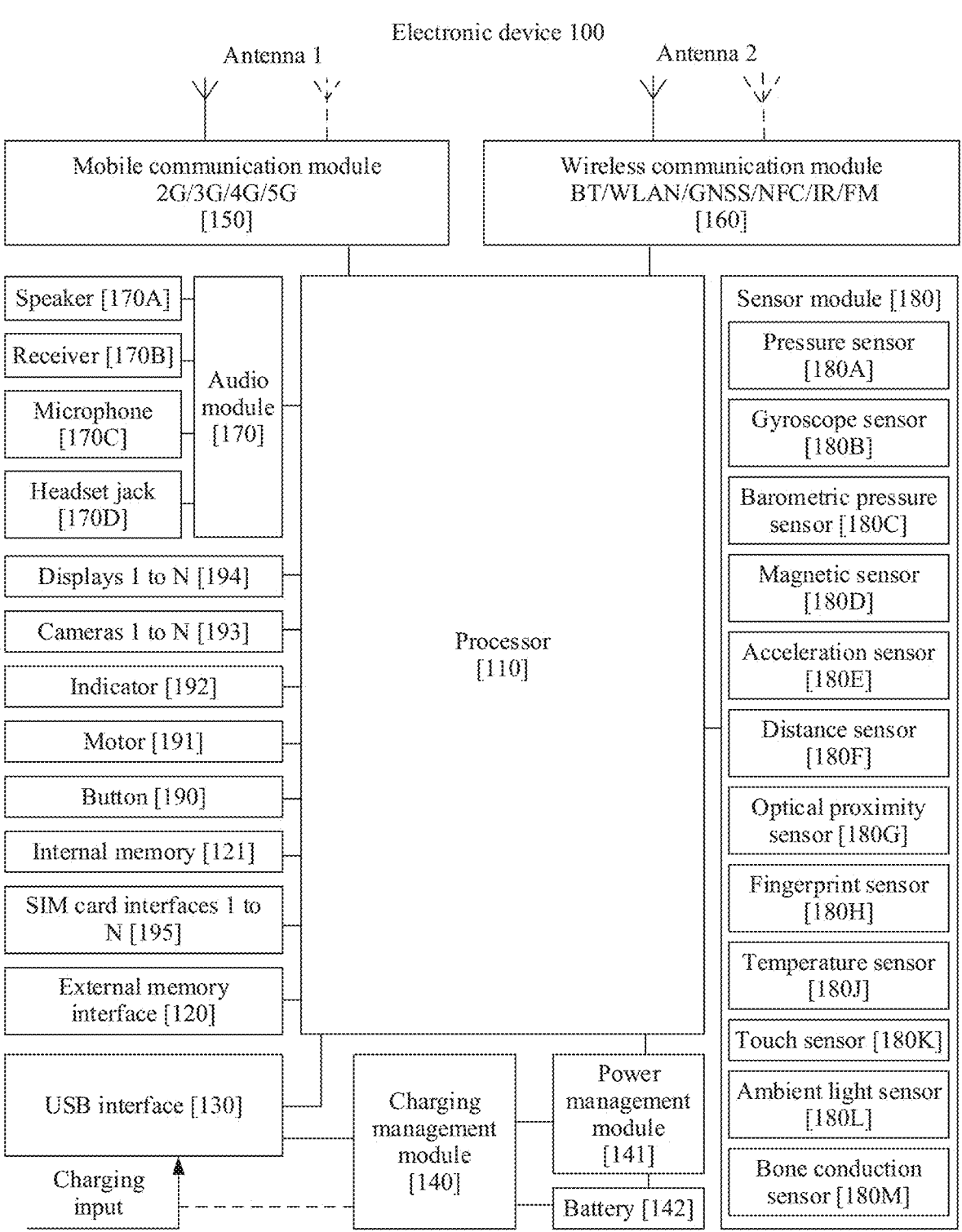
FIG. 1 is a schematic diagram of a structure of an electronic device according to an embodiment of this application.

In this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a, b, c, a combination of a and b, a combination of a and c, a combination of b and c, or a combination of a, b and c, where a, b, and c may be singular or plural. In addition, terms "first" and "second" are merely used for a purpose of description, and shall not be understood as an indication or implication of relative importance. In addition, directions or location relations indicated by terms "center", "vertical", "horizontal", "up", "down", "left", "right", "front", "back", and the like are directions or location relationships that are shown based on the accompanying drawings, and are merely intended for conveniently describing this application and simplifying descriptions, rather than indicating or implying that an indicated apparatus or component needs to have a specific orientation or needs to be constructed and operated in a specific orientation, and therefore cannot be understood as a limitation on this application.

This application provides an application recommendation method, an electronic device, a chip system, a computer-readable storage medium, and a computer program product. A category-tag cluster rule may be used to cluster a plurality of applications based on a tag of each application. That is, a plurality of applications in a same category are clustered into applications of different tag types. Any category may include a plurality of tag types. Each application may include one or more tag types.

In this way, applications can be recommended in a clustered manner based on the plurality of tag types, and a user is guided to perform search in a stacked manner, so that a path for the user to search for an application is shortened, and then the user can quickly find an application that needs to be downloaded and installed.

In response to search content input by the user on a search page, the electronic device may recommend, on a result page, applications of a plurality of tag types associated with the search content. The plurality of tag types are different tag types in a same category, or the plurality of tag types are different tag types in different categories. In this way, applications of a plurality of tag types in a specific category can be displayed in a stacked manner, so that the user can search for applications in a refined manner. This helps guide the user to compare applications of different tag types, and further guides the user to download and install the applications of the plurality of tag types.

In response to an operation of viewing a specific application on the result page by the user, the electronic device may display details about the application on a details page, and continue to recommend, on the details page, the applications of the plurality of tag types associated with the search content. In this way, w % ben details about any application are displayed, applications of a plurality of tag types in a specific category may be further displayed in a stacked manner. This helps the user continuously search for applications in a refined manner, without returning to the search page and performing search again by modifying the search content by the user.

In addition, in response to an operation of viewing an application of a specific tag type on the result page and/or the details page by the user, the electronic device may recommend, on an expanded page, a plurality of applications of the tag type. In this way, a plurality of applications of any tag type in a specific category can be displayed in a tiled manner, so that the user can quickly find an application that needs to be downloaded and installed.

In addition, when recommending an application of any tag type on the expanded page, the electronic device may further provide an entry for an application of another tag type, so that the user can switch to the application of the another tag type that the user wants to view.

The another tag type and the foregoing plurality of tag types may belong to a same category, or may belong to different categories. This is not limited in this application.

The electronic device may be a mobile phone, a tablet computer, a notebook computer, a wearable device, a vehicle-mounted device, an augmented reality (augmented reality, AR)/virtual reality (virtual reality, VR) device, an ultra-mobile personal computer (ultra-mobile personal computer, UMPC), a netbook, a personal digital assistant (personal digital assistant, PDA), a smart television, a smart screen, a high-definition television, a 4K television, a smart speaker, a smart projector, or another device. A specific type of the electronic device is not limited in this application.

With reference to FIG. 1, an electronic device in this application is described below by using an example in which the electronic device is a mobile phone.

FIG. 1 is a schematic diagram of a structure of an electronic device according to an embodiment of this application. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, sampling, quantizing, and encoding an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component like the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to perform data transmission between the electronic device 100 and a peripheral device, or may be configured to connect to a headset for playing an audio through the headset. The interface may be further configured to connect to another electronic device, for example, an AR device.

It may be understood that an interface connection relationship between modules illustrated in this application is merely an example for description, and does not constitute a limitation on the structure of the electronic device 100. In some other embodiments, the electronic device 100 may alternatively use an interface connection manner different from that in the foregoing embodiments, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. When charging the battery 142, the charging management module 140 may further supply power to the electronic device through the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G/3G/4G/5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules in the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in the same device as the mobile communication module 150 or another functional module.

The wireless communication module 160 may provide a solution, applied to the electronic device 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and a skin tone of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of types of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a mode of transfer between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, and may further include a non-volatile memory, for example, at least one magnetic disk storage device, a flash memory, or a universal flash storage (universal flash storage, UFS).

The electronic device 100 may implement an audio function, for example, music playing or recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines a pressure intensity based on the change in the capacitance. When a touch operation is performed on the display 194, the electronic device 100 detects an intensity of the touch operation through the pressure sensor 180A. The electronic device 100 may also calculate a touch location based on a detection signal of the pressure sensor 180A. In some embodiments, touch operations that are performed at a same touch location but have different touch operation intensities may correspond to different operation instructions. For example, when a touch operation whose touch operation intensity is less than a first pressure threshold is performed on a Messaging application icon, an instruction for viewing an SMS message is executed. When a touch operation whose touch operation intensity is greater than or equal to a first pressure threshold is performed on a Messaging application icon, an instruction for creating a new SMS message is executed.

The gyroscope sensor 180B may be configured to determine a motion posture of the electronic device 100. In some embodiments, angular velocities of the electronic device 100 around three axes (which are x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature like automatic unlocking of the flip cover is set based on a detected open or closed state of the leather case or the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in applications like switching between a landscape mode and a portrait mode and a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED), and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 1803 is configured to detect a temperature. In some embodiments, the electronic device 100 executes a temperature processing policy by using the temperature detected by the temperature sensor 180J. For example, when the temperature reported by the temperature sensor 1803 exceeds a threshold, the electronic device 100 lowers performance of a processor located near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transmit the detected touch operation to the application processor, to determine a type of a touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse, to receive a blood pressure beating signal. In some embodiments, the bone conduction sensor 180M may alternatively be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is also compatible with different types of SIM cards. The SIM card interface 195 is also compatible with an external memory card. The electronic device 100 interacts with a network through the SIM card, to implement functions such as a call and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a microservice architecture, or a cloud architecture. In this application, an example of a software structure of the electronic device 100 is described by using an Android system with a layered architecture as an example. A type of an operating system of the electronic device is not limited in this application, for example, an Android system, a Linux system, a Windows system, an iOS system, or a Harmony operating system (Harmony operating system, HarmonyOS).

Figure 2:
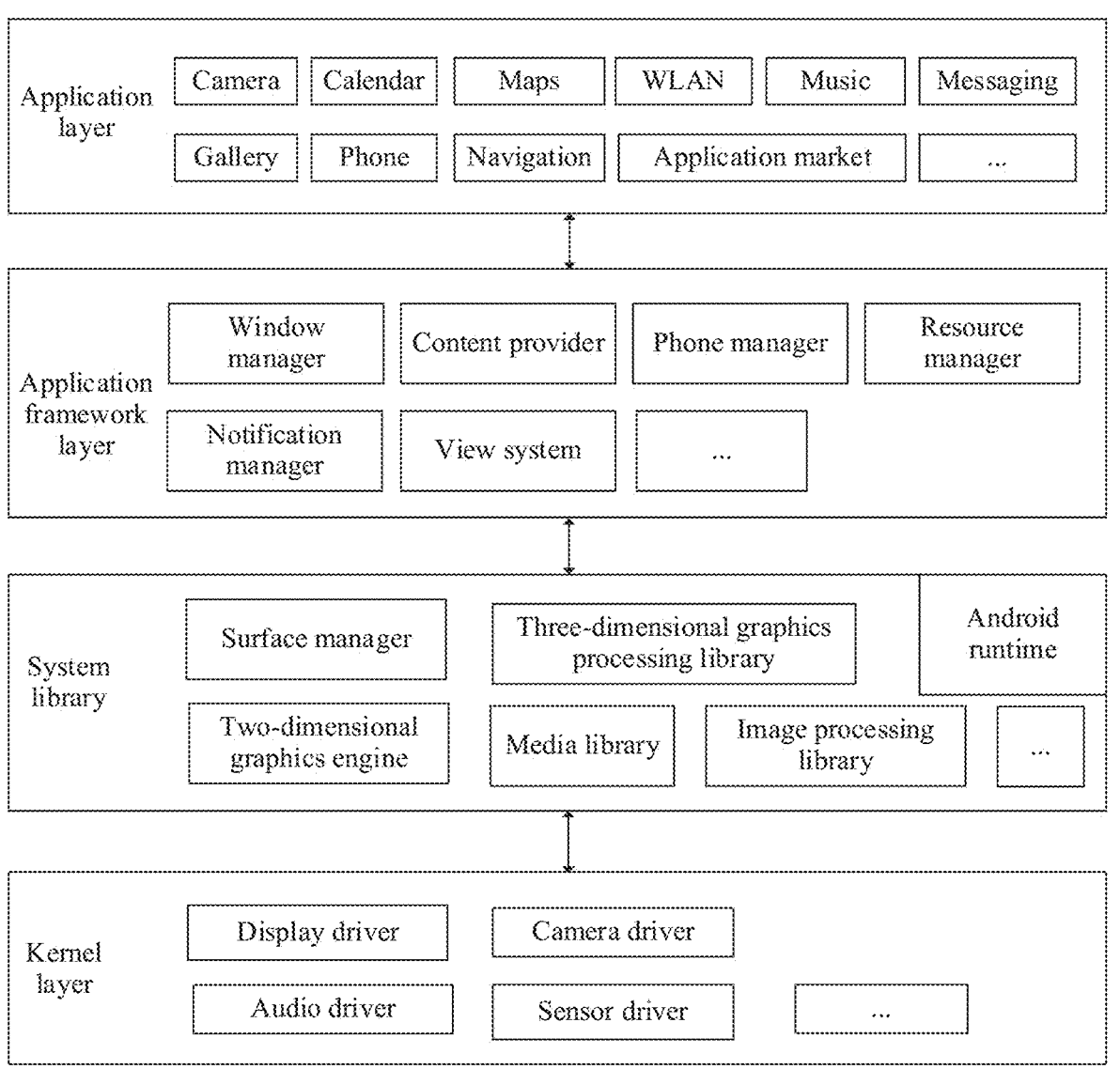
FIG. 2 is a block diagram of a software structure of an electronic device according to an embodiment of this application.

FIG. 2 is a block diagram of a software structure of an electronic device according to an embodiment of this application. As shown in FIG. 2, in a layered architecture, software is divided into several layers, and each layer has a clear role and task. The layers communicate with each other through a software interface. In some embodiments, the Android system is divided into four layers: an application (APP) layer, an application framework (APP framework) layer, an Android runtime (Android runtime) and system library (library), and a kernel (kernel) layer from top to bottom.

The application layer may include a series of application packages.

As shown in FIG. 2, the application packages may include applications (applications, APPs) such as Camera. Gallery, Calendar, Phone, Maps, Navigation, WLAN, Bluetooth, Music, Videos, Game, Shopping, Traveling, Instant Messaging (for example, Messaging), Smart Home, and Device Control.

The Smart Home application may be for controlling or managing a home device having a networking function. For example, the home device may include an electric light, a television, and an air conditioner. For another example, the home device may further include an anti-theft door lock, a speaker, a robotic vacuum cleaner, a socket, a body fat scale, a desk lamp, an air purifier, a refrigerator, a washing machine, a water heater, a microwave oven, an electric rice cooker, a curtain, a fan, a television, a set-top box, a door, a window, and the like.

In addition, the application packages may further include applications such as a desktop (namely, a home screen), a leftmost screen, a control center, and a notification center.

The leftmost screen may also be referred to as a "−1 screen", and is a user interface (user interface, UI) obtained by sliding a screen rightward on the home screen of the electronic device until sliding to a leftmost split screen. For example, the leftmost screen may be used to place some quick service functions and notification messages, such as global search, a quick entry (a payment code, WeChat, and the like) of a page of an application, instant information, a reminder (package delivery information, expenditure information, commuting road conditions, taxi hailing information, schedule information, and the like), and following dynamics (such as a football stand, a basketball stand, and stock information). The control center is a slide-up message notification panel of the electronic device, namely, a user interface displayed by the electronic device when a user starts to perform a slide-up operation at the bottom of the electronic device. The notification center is a pull-down message notification panel of the electronic device, that is, a user interface displayed by the electronic device when the user starts to perform a downward operation on the top of the electronic device.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager (window manager) is configured to manage window programs, such as managing a window status and attributes, adding, deleting, and updating views (view), managing a window sequence, and collecting and processing messages. The window manager may obtain a size of the display, determine whether there is a status bar, perform screen locking, take a screenshot, and the like. In addition, the window manager is an entry for external access to a window.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying a picture. The view system may be configured to construct an application. A display interface may include one or more views. For example, a display interface including an SMS message notification icon may include a view for displaying a text and a view for displaying a picture.

The phone manager is configured to provide a communication function for the electronic device 100, for example, management of a call status (including answering, declining, or the like).

The resource manager (resource manager) provides various resources for an application, such as a localized character string, an icon, a picture, a layout file (layout xml) of a user interface, a video file, a font, a color, and an identity document (identity document, ID) (which may also be referred to as a serial number or an account) of a user interface module (user interface module, UI module). In addition, the resource manager is configured to uniformly manage the foregoing resources.

The notification manager (notification manager) enables an application to display notification information in a status bar, and may be configured to convey a message of a notification type. The displayed notification information may automatically disappear after a short stay without user interaction. For example, the notification manager is configured to notify download completion, give a message notification, and the like. The notification manager may further display a notification in a form of a graph or a scroll bar text in a top status bar of the system, for example, a notification of an application that is run in a background, or may display a notification in a form of a dialog window on a screen. For example, text information is displayed in the status bar, a prompt tone is made, the electronic device vibrates, or an indicator blinks.

The Android runtime includes a kernel library and a virtual machine. The Android runtime is responsible for scheduling and management of the Android system.

The kernel library includes two parts: a function that needs to be invoked in a Java language and a kernel library of the Android system.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), a 2D graphics engine (for example, SGL), an image processing library, and a desktop launcher (launcher).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which a sound is played by using a smart speaker, the following describes an example of a working procedure of software and hardware of the electronic device 100.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a smart speaker icon. A smart speaker application invokes an interface of the application framework layer to start the smart speaker application, and further starts the audio driver by invoking the kernel layer, so that an audio electrical signal is converted into a sound signal by using the speaker 170A.

It may be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

Based on the foregoing descriptions, with reference to the accompanying drawings and an application scenario, an application recommendation method provided in this application is described in detail in the following embodiments of this application by using the electronic device having the structures shown in FIG. 1 and FIG. 2 as an example.

FIG. 3A to FIG. 3I are schematic diagrams of human-machine interaction interfaces according to an embodiment of this application. For ease of description, in FIG. 3A to FIG. 3I, an example in which the electronic device is a mobile phone and an application market application is installed on the mobile phone is used for illustration.

Figure 3A:
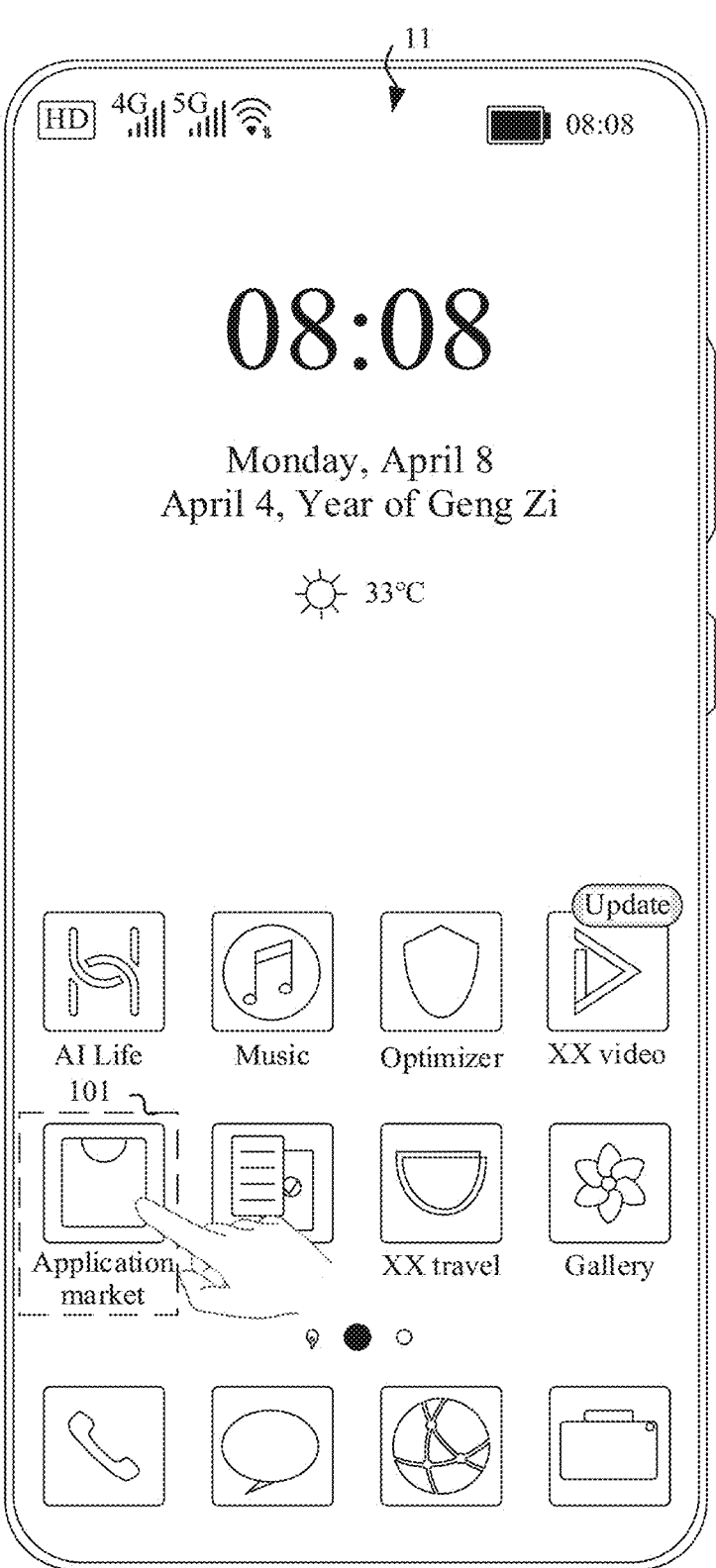

The mobile phone may display an example user interface 11 shown in FIG. 3A. The user interface 11 may be a home screen (home screen) of a desktop. The user interface 11 may include but is not limited to: a status bar, a navigation bar, a calendar indicator, a weather indicator, and icons of a plurality of application such as an icon of an AI Life application, an icon of a Music application, an icon of an Optimizer application, an icon of an XX video application, an icon 101 of an Application market application, an icon of a Notepad application, an icon of an XX travel application, an icon of a Gallery application, an icon of a Phone application, an icon of a Messaging application, an icon of a Browser application, and an icon of a Camera application.

Figure 3B:
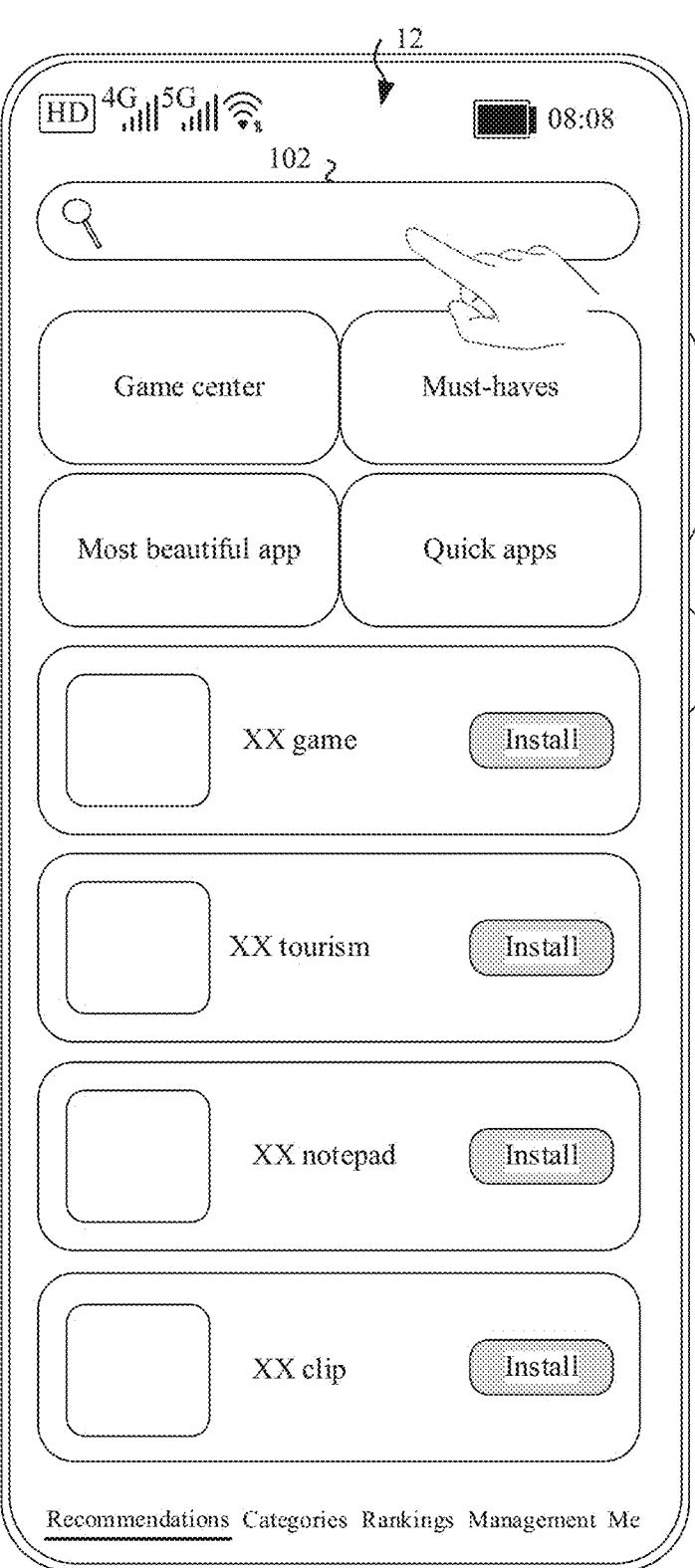

After detecting an operation that is of starting the Application market application (for example, performing a tap operation on the icon 101 of the Application market application shown in FIG. 3A) and that is indicated by a user, the mobile phone may display an example user interface 12 shown in FIG. 3B.

The user interface 12 may be a user interface (for example, a home screen) of the Application market application. In addition, the user interface 12 may be considered as a search page of the Application market application. Alternatively, the user interface 12 may be a web page of a web page version of the Application market. In addition, the user interface 12 may be considered as a search page of the web page version of the Application market. Alternatively, the user interface 12 may be a page of an Application market official account. In addition, the user interface 12 may be considered as a search page of the Application market official account. For ease of description, the Application market application is used as an example for illustration in this application.

In FIG. 3B, the user interface 12 may include a search box 102. The search box 102 is used to provide an entry for searching for a query (query) word.

Figure 3C:
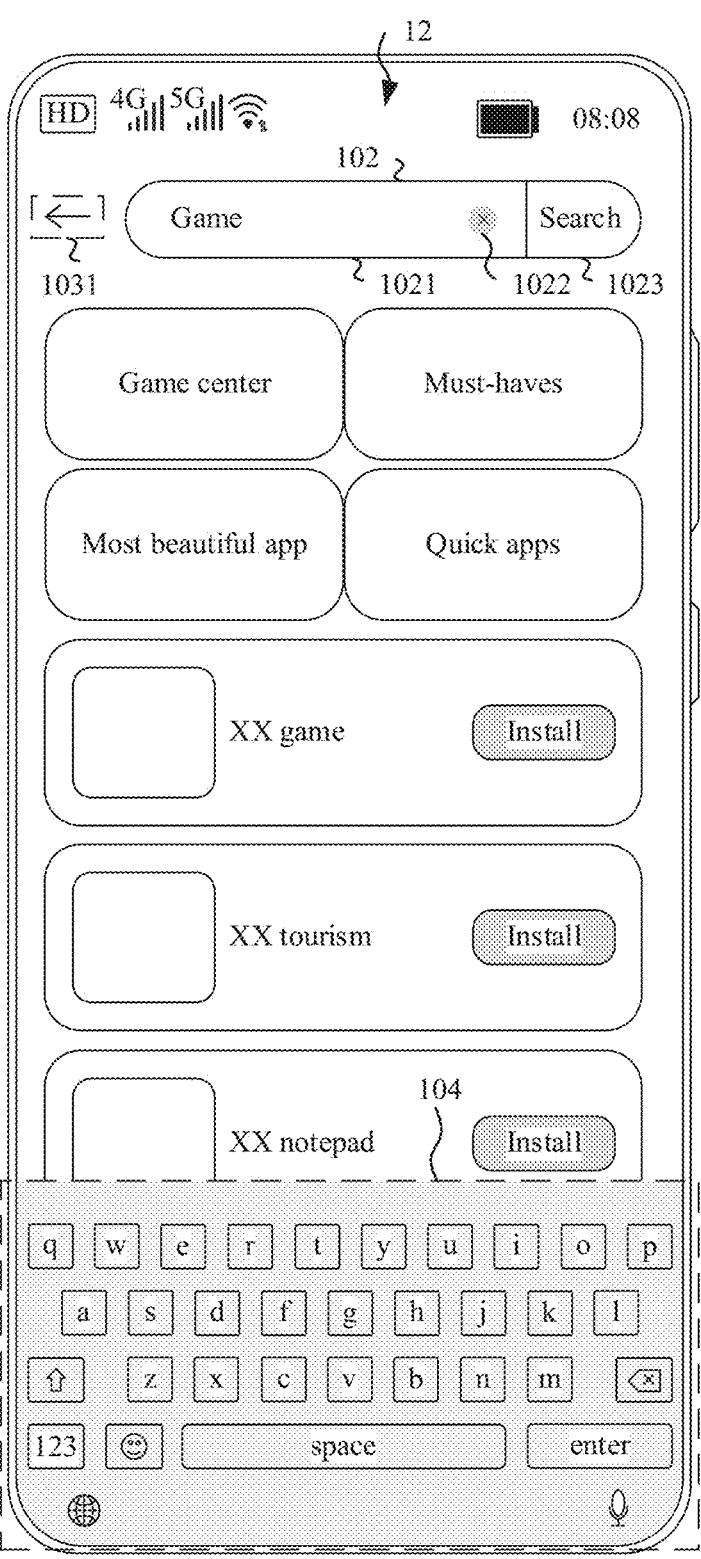

After detecting an operation of searching for the query word (for example, an operation of inputting a query word "game" in the search box 102 shown in FIG. 3B) by the user, the mobile phone may display, on the user interface 12, an example search box 102, an example control 1031, and an example window 104 that are shown in FIG. 3C.

The search box 102 may include an input box 1021, a control 1022, and a control 1023. The input box 1021 is used to display the query word input through the window 104. The control 1022 is used to delete the query word input through the window 104. The control 1023 is used to provide an entry for searching for the query word in the input box 1021. The window 104 is used to display a keyboard and provide an entry for inputting the query word into the search box 1021. The control 1031 is used to provide an entry for returning to the user interface 12 shown in FIG. 3B.

Figure 3D:
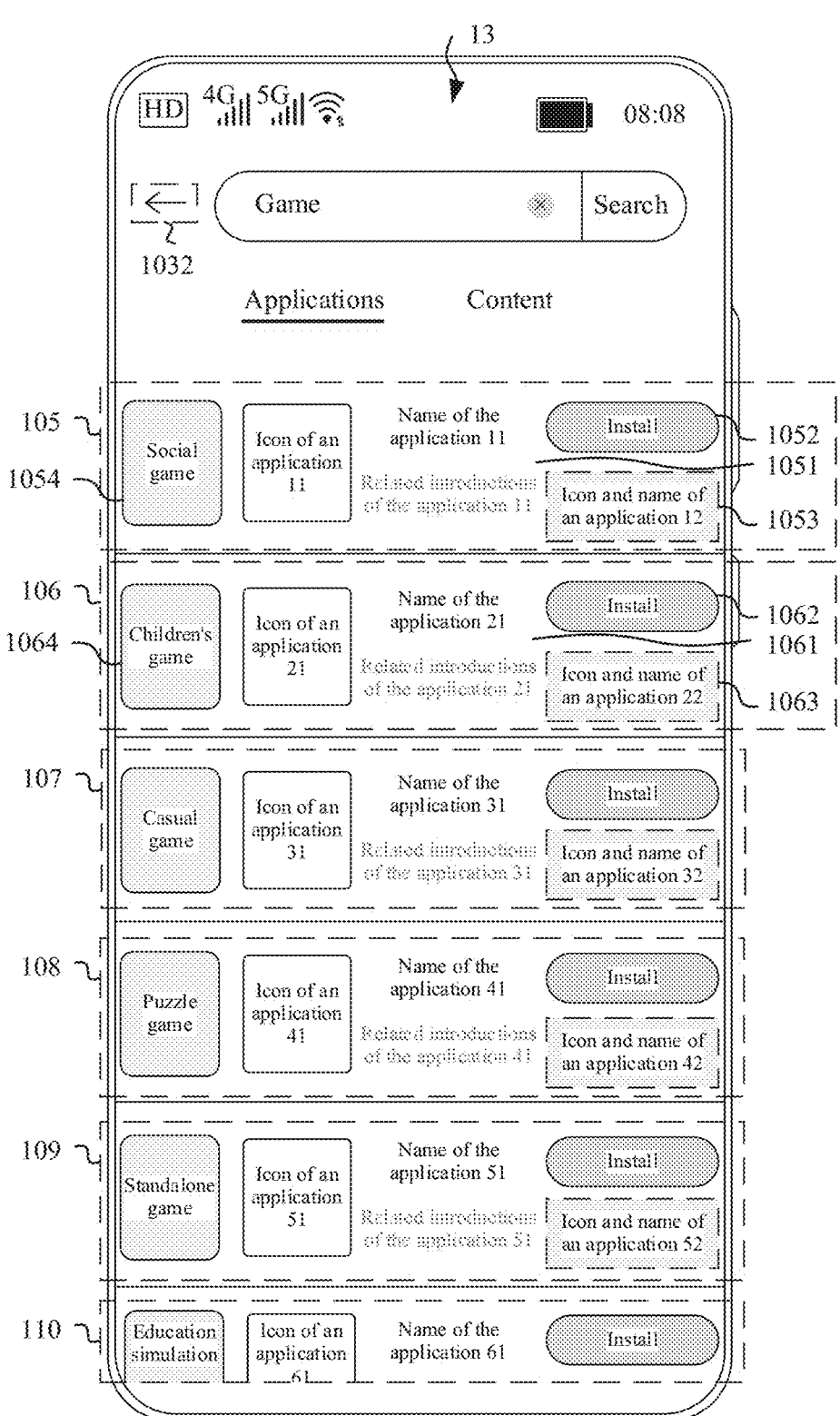

After detecting an operation that is of searching for the query word "game" (for example, performing a tap operation on the control 1023 shown in FIG. 3C) and that is indicated by the user, the mobile phone may display an example user interface 13 shown in FIG. 3D or FIG. 3I. The user interface 13 may be a user interface of the Application market application, and the user interface 13 is used to display a result of searching for the query word. In addition, the user interface 13 may be considered as a result page of searching for the query word "game".

In FIG. 3D or FIG. 3I, applications of a plurality of tag types in a game category may be recommended on the user interface 13.

The query word is associated with the plurality of tag types. For example, the plurality of tag types are different tag types in the game category, or the plurality of tag types are different tag types in the game category and another category.

Sorting of the applications of the plurality of tag types may be displayed based on one or more of an installation quantity (namely, a download quantity), a score, and a click-through rate of an application of each tag type.

For example, when a highest score for applications of a tag type 1 is higher than a highest score for applications of a tag type 2, the mobile phone may first display the applications of the tag type 1 on the user interface 13, and then display the applications of the tag type 2. Alternatively, when an installation quantity of applications of a tag type 1 is larger than an installation quantity of applications of a tag type 2, the mobile phone may first display the applications of the tag type 1 on the user interface 13, and then display the applications of the tag type 2.

Sorting of applications of each tag type may be displayed based on one or more of an installation quantity (namely, a download quantity), a score, and a click-through rate of each application.

For example, in the applications of the tag type 1, an application 1 has a highest score. In this case, the mobile phone may display the application 1 on the user interface 13. Alternatively, in the applications of the tag type 1, an application 2 has a largest installation quantity. In this case, the mobile phone may display the application 2 on the user interface 13.

In some embodiments, the user interface 13 shown in FIG. 3D or FIG. 3I may include a control 1032, an area 105, an area 106, an area 107, an area 108, an area 109, and an area 110.

The control 1032 is used to provide an entry for returning to the user interface 12 shown in FIG. 3B or the user interface 12 shown in FIG. 3C.

The area 105 is used to recommend one or more applications corresponding to a social game in the game category.

The area 105 may include an area 1051 and a control 1052.

The area 1051 is used to display description content such as an icon, a name, and related introductions (such as an application description, a download quantity, a rating level, and a function interface) of an application 11. In FIG. 3D, the area 1051 is used to display the icon, the name, and the related introductions of the application 11. In FIG. 3I, the area 1051 is used to display the icon and the name of the application 11.

The control 1052 is used to provide an entry for installing, updating, or starting the application 11. When the application 11 is not installed on the mobile phone, the control 1052 may be used to provide an entry for downloading and installing the application 11. When the application 11 is installed on the mobile phone, and the application 11 is not of a latest version, the control 1052 may be used to provide an entry for updating the application 11. When the application 11 is installed on the mobile phone, and the application 11 is of a latest version, the control 1052 may be used to provide an entry for starting the application 11. In addition, whether the application 11 is installed on the mobile phone is not limited in this application. For ease of description, in FIG. 3D or FIG. 3I, an example in which the control 1052 is used to provide an entry for downloading and installing the application 11 is used for illustration.

A tag type of the application 11 is the social game, and the application 11 is any application in all applications corresponding to the social game. For example, in all the applications corresponding to the social game, the application 11 is an application with a highest score, or the application 11 is an application with a largest installation quantity.

In addition, the area 1051 is further used to recommend an entry of another application than the application 11 in all the applications corresponding to the social game. In some embodiments, when detecting an operation that is performed on the another application in the area 1051 (for example, performing an operation like sliding left/right/up/down in the area 1051) and that is indicated by the user, the mobile phone may display description content such as an icon, a name, and related introductions of the another application in the area 1051.

In addition, in FIG. 3D, the area 105 may further include a control 1053. The control 1053 is used to display an icon and/or a name of an application 12, and provide an entry for viewing details about the application 12.

A tag type of the application 12 is the social game, and application 12 is any application other than the application 11 in all the applications corresponding to the social game. For example, in all the applications corresponding to the social game, the application 12 is an application with a second highest score, or the application 12 is an application with a second largest installation quantity.

In addition, the area 105 may further include a control 1054. The control 1054 is used to display a tag type of the applications recommended in the area 105, that is, the social game. The control 1054 is further used to provide an entry for displaying, in a tiled manner, a plurality of applications corresponding to the social game.

It should be understood that the area 105 may not include the control 1053 and/or the control 1054. In some embodiments, the area 105 may further include two controls. One control is used to display a tag type of the applications recommended in the area 105, and the other control is used to provide an entry for displaying, in a tiled manner, a plurality of applications corresponding to the social game.

The area 106 is used to recommend one or more applications corresponding to a children's game in the game category.

The area 106 may include an area 1061 and a control 1062.

The area 1061 is used to display description content such as an icon, a name, and related introductions (such as an application description, a download quantity, a rating level, and a function interface) of an application 21.

The control 1062 is used to provide an entry for installing, updating, or starting the application 21. When the application 21 is not installed on the mobile phone, the control 1062 may be used to provide an entry for downloading and installing the application 21. When the application 21 is installed on the mobile phone, and the application 21 is not of a latest version, the control 1062 may be used to provide an entry for updating the application 21. When the application 21 is installed on the mobile phone, and the application 21 is of a latest version, the control 1062 may be used to provide an entry for starting the application 21. In addition, whether the application 21 is installed on the mobile phone is not limited in this application. For ease of description, in FIG. 3D or FIG. 3I, an example in which the control 1062 is used to provide an entry for downloading and installing the application 21 is used for illustration.

A tag type of the application 21 is the children's game, and the application 21 is any application in all applications corresponding to the children's game. For example, in all the applications corresponding to the children's game, the application 21 is an application with a highest score, or the application 21 is an application with a largest installation quantity.

In addition, the area 1061 is further used to recommend an entry of another application than the application 21 in all the applications corresponding to the children's game. In some embodiments, when detecting an operation that is performed on the another application in the area 1061 (for example, performing an operation like sliding left/right/up/down in the area 1061) and that is indicated by the user, the mobile phone may display description content such as an icon, a name, and related introductions of the another application in the area 1061.

In addition, the area 106 may further include a control 1063. The control 1063 is used to display an icon and/or a name of an application 22, and provide an entry for viewing details about the application 22.

A tag type of the application 22 is the children's game, and the application 22 is any application other than the application 21 in all the applications corresponding to the children's game. For example, in all the applications corresponding to the children's game, the application 22 is an application with a second highest score, or the application 22 is an application with a second largest installation quantity.

In addition, the area 106 may further include a control 1064. The control 1064 is used to display a tag type of the applications recommended in the area 106, that is, the children's game. The control 1064 is further used to provide an entry for displaying, in a tiled manner, a plurality of applications corresponding to the children's game.

It should be understood that the area 1056 may not include the control 1063 and/or the control 1064. In some embodiments, the area 106 may further include two controls. One control is used to display a tag type of the applications recommended in the area 106, and the other control is used to provide an entry for displaying, in a tiled manner, a plurality of applications corresponding to the children's game.

The area 107 is used to recommend one or more applications corresponding to a casual game in the game category, for example, an application 31 and an application 32. The area 108 is used to recommend one or more applications corresponding to a puzzle game, for example, an application 41 and an application 42. The area 109 is used to recommend one or more applications corresponding to a standalone game, for example, an application 51 and an application 52. The area 110 is used to recommend one or more applications corresponding to an education simulation game, for example, an application 61 and an application 62.

Specific implementations of the area 107, the area 108, the area 109, and the area 110 are similar to the implementations/implementation in the descriptions of the area 105 and/or the area 106. Details are not described herein again. Whether the application 41, the application 42, the application 51, the application 52, the application 61, and the application 62 are installed on the mobile phone is not limited in this application.

It can be learned that after receiving the query word input by the user on the search page, the electronic device may recommend, on the result page of the query word, the applications of the plurality of tag types associated with the query word. The plurality of tag types are different tag types in a same category, or the plurality of tag types are different tag types in different categories.

Figure 3E:
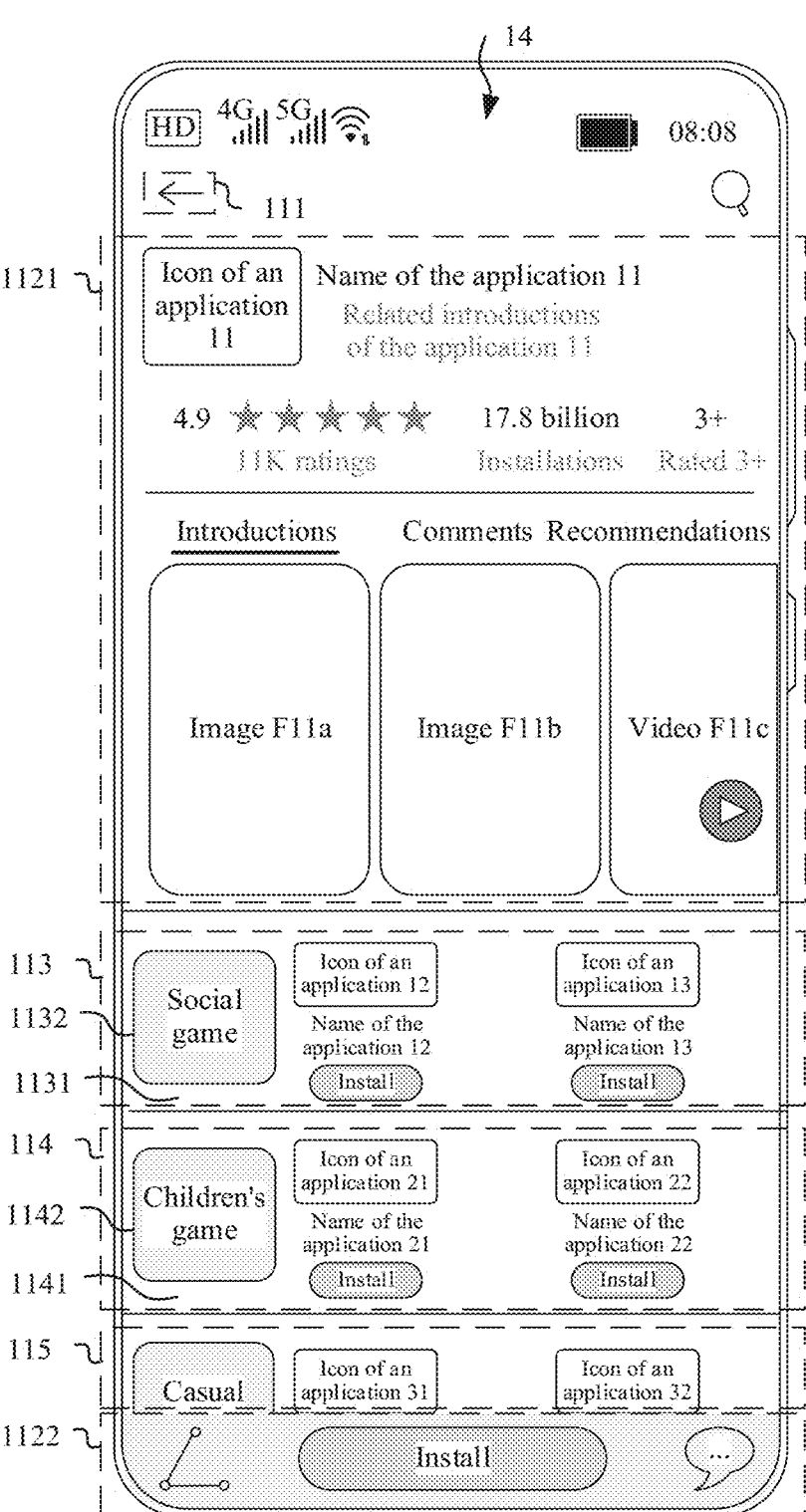

After detecting an operation that is of viewing the application 11 (for example, performing a tap operation on the control 1051 shown in FIG. 3D or FIG. 3I) and that is indicated by the user, the mobile phone may display an example user interface 14 shown in FIG. 3E. The user interface 14 may be a user interface of the Application market application, and the user interface 14 is used to display details about the application 11. In addition, the user interface 14 may be considered as a details page of the application 11.

In FIG. 3E, the user interface 14 may include a control 111, an area 1121, and an area 1122.

The control 111 is used to provide an entry for returning to the user interface 13 shown in FIG. 3D or FIG. 3I.

The area 1121 is used to display the details about the application 11, for example, one or more of an icon, a name, another description, a rating score, a rating level, a quantity of rating users, a download quantity, life duration, a function interface, comment information, a recommendation description, a function description, a function introduction, a developer, and the like.

The area 1122 is used to provide an entry for sharing the application 11, installing, updating, or starting the application 11, viewing the comment information of the application 11, and the like.

In addition, in addition to the foregoing content, the user interface 14 shown in FIG. 3E is further used to continue to display a result of searching for the query word. The result that is of searching for the query word and that is recommended on the user interface 14 shown in FIG. 3E is the same as or similar to that is recommended on the user interface 13 shown in FIG. 3D or FIG. 3I.

In consideration of a case in which an area that can be displayed on the user interface 14 shown in FIG. 3E is limited, in addition to the application 11, one or more applications having the same tag type as the application 11 may be recommended on the user interface 14. In addition, one or more applications of another tag type in addition to the tag type of the application 11 in the game category may be further recommend on the user interface 14. Applications of a plurality of tag types and a display sequence of the applications of the tag types that are recommended on the user interface 14 shown in FIG. 3E are the same as those that are recommended on the user interface 13 shown in FIG. 3D or FIG. 3I.

In addition, the user interface 14 is further used to recommend an entry of an application of another tag type in addition to the tag types of the displayed applications in the game category. In some embodiments, when detecting an operation that is performed on the application of the another tag type on the user interface 14 (for example, performing an operation like sliding left/right/up/down on the user interface 14) and that is indicated by the user, the mobile phone may recommend the application of the another tag type on the user interface 14.

In some embodiments, the user interface 14 shown in FIG. 3E may further include an area 113, an area 114, and an area 115.

The area 113 is used to recommend one or more applications other than the application 11 corresponding to the social game. A specific implementation of the area 113 is similar to the implementation in the descriptions of the area 105 shown in FIG. 3D or FIG. 3I. In consideration of a case in which the user wants to view the details page of the application 11 in the area 105, the applications displayed in the area 113 do not include the application 11. In this case, the applications displayed in the area 113 are different from the applications displayed in the area 105. In addition, a manner of displaying the applications in the area 113 may be the same as or different from a manner of displaying the applications in the area 105.

In some embodiments, the area 113 may include an area 1131, a control 1132, and another area.

The area 1131 is used to recommend an entry of another application than the application 11, the application 12, and an application 13 in the applications corresponding to the social game. In some embodiments, when detecting an operation that is performed on the another application in the area 1131 (for example, performing an operation like sliding left/right/up/down in the area 1131) and that is indicated by the user, the mobile phone may recommend the another application in the area 1131.

A tag type of the application 13 is the social game, and the application 13 is any application other than the application 11 and the application 12 in all the applications corresponding to the social game. For example, in all the applications corresponding to the social game, the application 13 is an application with a third highest score, or the application 13 is an application with a third largest installation quantity.

The control 1132 is used to display a tag type of the applications recommended in the area 113, that is, the social game. The control 1132 is further used to provide an entry for displaying, in a tiled manner, a plurality of applications corresponding to the social game.

The another area in the area 113 may include the icon of the application 12, the name of the application 12, a control of the application 12, an icon of the application 13, a name of the application 13, and a control of the application 13.

The control of the application 12 is used to provide an entry for installing, updating, or starting the application 12. When the application 12 is not installed on the mobile phone, the control of the application 12 may be used to provide an entry for downloading and installing the application 12. When the application 12 is installed on the mobile phone, and the application 12 is not of a latest version, the control of the application 12 may be used to provide an entry for updating the application 12. When the application 12 is installed on the mobile phone, and the application 12 is of a latest version, the control of the application 12 may be used to provide an entry for starting the application 12. In addition, whether the application 12 is installed on the mobile phone is not limited in this application. For ease of description, in FIG. 3E, an example in which the control of the application 12 is used to provide an entry for downloading and installing the application 12 is used for illustration.

The control of the application 13 is used to provide an entry for installing, updating, or starting the application 13. When the application 13 is not installed on the mobile phone, the control of the application 13 may be used to provide an entry for downloading and installing the application 13. When the application 13 is installed on the mobile phone, and the application 13 is not of a latest version, the control of the application 13 may be used to provide an entry for updating the application 13. When the application 13 is installed on the mobile phone, and the application 13 is of a latest version, the control of the application 13 may be used to provide an entry for starting the application 13. In addition, whether the application 13 is installed on the mobile phone is not limited in this application. For ease of description, in FIG. 3E, an example in which the control of the application 13 is used to provide an entry for downloading and installing the application 13 is used for illustration.

The area 114 is used to recommend applications corresponding to the children's game. A specific implementation of the area 114 is similar to the implementation in the descriptions of the area 106 shown in FIG. 3D or FIG. 3I. In consideration of a case in which the user wants to view the details page of the application 11, the applications displayed in the area 114 are the same as the applications displayed in the area 106. In addition, a manner of displaying the applications in the area 114 may be the same as or different from a manner of displaying the applications in the area 106.

In some embodiments, the area 114 may include an area 1141, a control 1142, and another area.

The area 1141 is used to recommend an entry of another application than the application 21 and the application 22 in the applications corresponding to the children's game. In some embodiments, when detecting an operation that is performed on the another application in the area 1141 (for example, performing an operation like sliding left/right/up/down in the area 1141) and that is indicated by the user, the mobile phone may recommend the another application in the area 1141.

The control 1142 is used to display a tag type of the applications recommended in the area 114, that is, the children's game. The control 1142 is further used to provide an entry for displaying, in a tiled manner, a plurality of applications corresponding to the children's game.

The another area in the area 114 may include the icon of the application 21, the name of the application 21, a control of the application 21, an icon of the application 22, a name of the application 22, and a control of the application 22.

The control of the application 21 is used to provide an entry for installing, updating, or starting the application 21. When the application 21 is not installed on the mobile phone, the control of the application 21 may be used to provide an entry for downloading and installing the application 21. When the application 21 is installed on the mobile phone, and the application 21 is not of a latest version, the control of the application 21 may be used to provide an entry for updating the application 21. When the application 21 is installed on the mobile phone, and the application 21 is of a latest version, the control of the application 21 may be used to provide an entry for starting the application 21. In addition, whether the application 21 is installed on the mobile phone is not limited in this application. For ease of description, in FIG. 3E, an example in which the control of the application 21 is used to provide an entry for downloading and installing the application 21 is used for illustration.

The control of the application 22 is used to provide an entry for installing, updating, or starting the application 22. When the application 22 is not installed on the mobile phone, the control of the application 22 may be used to provide an entry for downloading and installing the application 22. When the application 22 is installed on the mobile phone, and the application 22 is not of a latest version, the control of the application 22 may be used to provide an entry for updating the application 22. When the application 22 is installed on the mobile phone, and the application 22 is of a latest version, the control of the application 22 may be used to provide an entry for starting the application 22. In addition, whether the application 22 is installed on the mobile phone is not limited in this application. For ease of description, in FIG. 3E, an example in which the control of the application 22 is used to provide an entry for downloading and installing the application 22 is used for illustration.

The area 115 is used to recommend applications corresponding to the casual game. A specific implementation of the area 115 is similar to the implementation in the descriptions of the area 107 shown in FIG. 3D or FIG. 3I. In consideration of a case in which the user wants to view the details page of the application 11, the applications displayed in the area 115 are the same as the applications displayed in the area 107. In addition, a manner of displaying the applications in the area 115 may be the same as or different from a manner of displaying the applications in the area 107.

In addition, because the user wants to view the details page of the application 11, and the user performs a trigger operation on the control 1051 in the area 105, the tag type of the application 11 is before other tag types, and sorting of the other tag types is still the sorting in FIG. 3D or FIG. 3I.

It can be learned that, in FIG. 3D or FIG. 3I, sorting 1 of the area 105, the area 106, and the area 107 is that the area 105 is before the area 106, and the area 106 is before the area 107. In FIG. 3E, sorting 2 of the area 113, the area 114, and the area 115 is that the area 113 is before the area 114, and the area 114 is before the area 115.

It can be learned that after receiving an operation of viewing a specific application by the user on a result page of any query word, the electronic device may display details about the application on a details page of the application, and continue to recommend, on the details page of the application, applications of a plurality of tag types associated with the query word. The plurality of tag types are different tag types in a same category, or the plurality of tag types are different tag types in different categories.

In this way, the applications of the plurality of tag types are continuously displayed in a stacked manner.

Figure 3F:
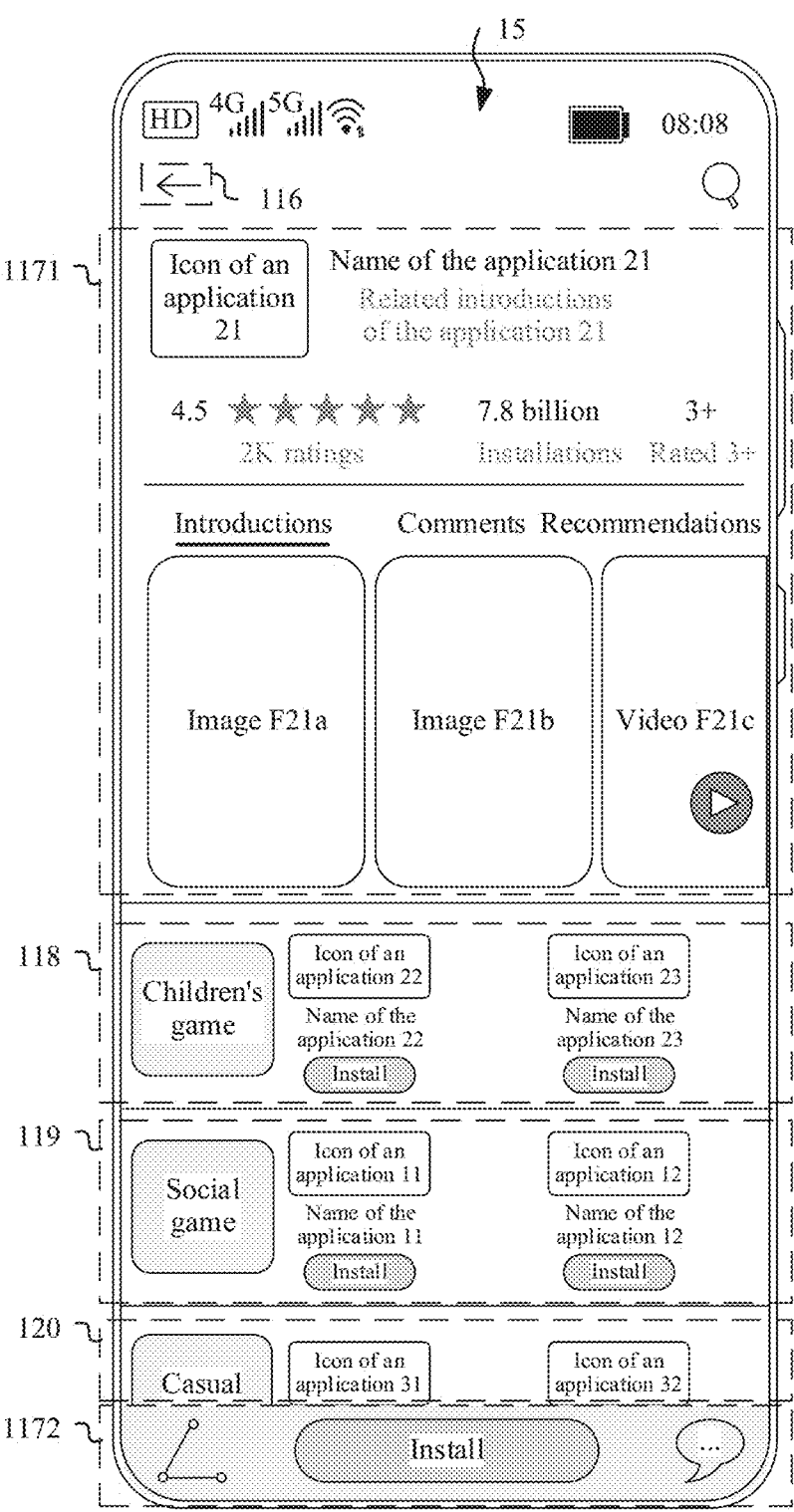

After detecting an operation that is of viewing the application 21 (for example, performing a tap operation on the area 1061 shown in FIG. 3D or FIG. 3I, or performing a tap operation on the icon or the name of the application 21 shown in FIG. 3E) and that is indicated by the user, the mobile phone may display an example user interface 15 shown in FIG. 3F. The user interface 15 may be a user interface of the Application market application, and the user interface 15 is used to display details about the application 21. In addition, the user interface 15 may be considered as a details page of the application 21.

In FIG. 3F, the user interface 15 may include a control 116, an area 1171, and an area 1172.

The control 116 is used to provide an entry for returning to a user interface (namely, the user interface 13 shown in FIG. 3D or FIG. 3I or the user interface 14 shown in FIG. 3E) on which entering of the user interface 15 shown in FIG. 3F is triggered.

The area 1171 is used to display the details about the application 21, for example, one or more of an icon, a name, another description, a rating score, a rating level, a quantity of rating users, a download quantity, life duration, a function interface, comment information, a recommendation description, a function description, a function introduction, a developer, and the like.

The area 1172 is used to provide an entry for sharing the application 21, installing, updating, or starting the application 21, viewing the comment information of the application 21, and the like.

In addition, in addition to the foregoing content, the user interface 15 shown in FIG. 3F is further used to continue to display a result of searching for the query word. The result that is of searching for the query word and that is recommended on the user interface 15 shown in FIG. 3F is the same as or similar to that is recommended on the user interface 13 shown in FIG. 3D or FIG. 3I and that is recommended on the user interface 14 shown in FIG. 3E.

In consideration of a case in which an area that can be displayed on the user interface 15 shown in FIG. 3F is limited, in addition to the application 21, one or more applications having the same tag type as the application 21 may be recommended on the user interface 15. In addition, one or more applications of another tag type in addition to the tag type of the application 21 in the game category may be further recommend on the user interface 15. Applications of a plurality of tag types and a display sequence of the applications of the tag types that are recommended on the user interface 15 shown in FIG. 3F are the same as those that are recommended on the user interface 14 shown in FIG. 3E and those that are recommended on the user interface 13 shown in FIG. 3D or FIG. 3I.

In addition, the user interface 15 is further used to recommend an entry of an application of another tag type in addition to the tag type of the displayed application in the game category. In some embodiments, when detecting an operation that is performed on the application of the another tag type on the user interface 15 (for example, performing an operation like sliding left/right/up/down on the user interface 15) and that is indicated by the user, the mobile phone may recommend the application of the another tag type on the user interface 15.

In some embodiments, the user interface 15 shown in FIG. 3F may further include an area 118, an area 119, and an area 120.

The area 118 is used to recommend one or more applications other than the application 21 corresponding to the children's game. A specific implementation of the area 118 is similar to the implementation in the descriptions of the area 106 shown in FIG. 3D or FIG. 3I or the implementation in the descriptions of the area 114 shown in FIG. 3E.

The area 119 is used to recommend one or more applications corresponding to the social game. A specific implementation of the area 119 is similar to the implementation in the descriptions of the area 105 shown in FIG. 3D or FIG. 3I or the implementation in the descriptions of the area 113 shown in FIG. 3E.

The area 120 is used to recommend one or more applications corresponding to the casual game. A specific implementation of the area 120 is similar to the implementation in the descriptions of the area 107 shown in FIG. 3D or FIG. 3I or the implementation in the descriptions of the area 115 shown in FIG. 3E. For example, the area 120 is the same as the area 115.

In addition, because the user wants to view the details page of the application 21, and the user performs a trigger operation on the control 1061 in the area 106, the tag type of the application 21 is before other tag types, and sorting of the other tag types is still the sorting in FIG. 3D or FIG. 3I.

It can be learned that, in FIG. 3D or FIG. 3I, sorting 1 of the area 105, the area 106, and the area 107 is that the area 105 is before the area 106, and the area 106 is before the area 107. In FIG. 3F, sorting 3 of the area 118, the area 119, and the area 120 is that the area 118 is before the area 119, and the area 119 is before the area 120.

In addition, because the user wants to view the details page of the application 21, and the user performs a trigger operation on the name or the icon of the application 21 in the area 114, the tag type of the application 21 is before other tag types, and sorting of the other tag types is still the sorting in FIG. 3E.

It can be learned that, in FIG. 3E, sorting 2 of the area 113, the area 114, and the area 115 is that the area 113 is before the area 114, and the area 114 is before the area 115. In FIG. 3F, sorting 3 of the area 118, the area 119, and the area 120 is that the area 118 is before the area 119, and the area 119 is before the area 120.

It can be learned that after receiving an operation of viewing a specific application by the user on a result page of any query word, the electronic device may display details about the application on a details page of the application, and continue to recommend, on the details page of the application, applications of a plurality of tag types associated with the query word. The plurality of tag types are different tag types in a same category, or the plurality of tag types are different tag types in different categories; and/or after receiving an operation of viewing another application by the user on the details page of the application, the electronic device may display details about the another application on a details page of the another application, and continue to recommend, on the details page of the another application, applications of a plurality of tag types associated with the query word. The plurality of tag types are different tag types in a same category, or the plurality of tag types are different tag types in different categories.

In this way, the applications of the plurality of tag types are continuously displayed in a stacked manner.

Figure 3G:
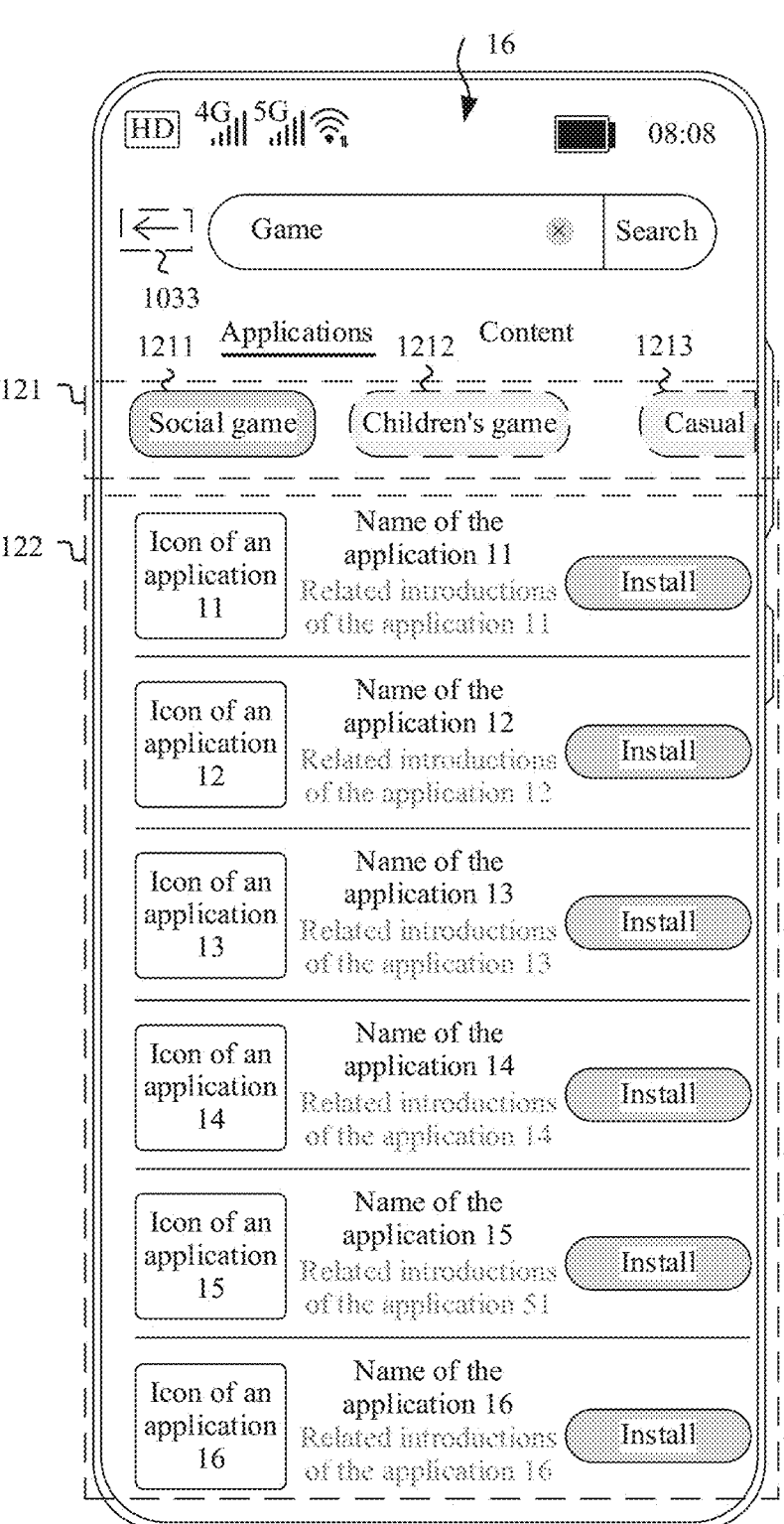

After detecting an operation that is of viewing an application of a specific tag type (for example, performing a tap operation on the control 1054 shown in FIG. 3D or FIG. 3I, or performing a tap operation on the area 1132 shown in FIG. 3E) and that is indicated by the user, the mobile phone may display an example user interface 16 shown in FIG. 3G. The user interface 16 may be a user interface of the Application market application, and the user interface 16 is used to display, in a tiled manner, a plurality of applications corresponding to the social game. In addition, the user interface 15 may be considered as an expanded page of the applications corresponding to the social game.

In FIG. 3G, the user interface 16 may include a control 1033, an area 121, and an area 122.

The control 1033 is used to provide an entry for returning to a user interface (namely, the user interface 13 shown in FIG. 3D or FIG. 3I or the user interface 14 shown in FIG. 3E) on which entering of the user interface 16 shown in FIG. 3G is triggered.

The area 121 may include an area 1211, an area 1212, and an area 1213. The area 1211 is used to display a tag type of the applications recommended in the area 122, that is, the social game, and provide an entry for displaying, in a tiled manner, the plurality of applications corresponding to the social game. The area 1212 is used to provide an entry for displaying, in a tiled manner, a plurality of applications corresponding to the children's game. The area 1213 is used to provide an entry for displaying, in a tiled manner, a plurality of applications corresponding to the casual game.

In addition, the area 121 is further used to recommend an entry of an application of another tag type in addition to the tag types (namely, the social game, the children's game, or the casual game) of the displayed applications in the game category. In some embodiments, when detecting an operation that is performed on the application of the another tag type on the user interface 16 (for example, performing an operation like sliding left/right/up/down on the user interface 16) and that is indicated by the user, the mobile phone may recommend the application of the another tag type on the user interface 16.

The area 122 is used to display, in a tiled manner, the plurality of applications corresponding to the social game.

In addition, the user interface 16 is further used to recommend an entry of another application in addition to the application 11, the application 12, the application 13, the application 14, the application 15, and an application 16 in all the applications corresponding to the social game. In some embodiments, when detecting an operation that is performed on the another application on the user interface 16 (for example, performing an operation like sliding left/right/up/down on the user interface 16) and that is indicated by the user, the mobile phone may recommend the another application on the user interface 16.

In addition, after detecting an operation that is of viewing the application 11 (for example, performing a tap operation on the icon or the name of the application 11 shown in FIG. 3G) and that is indicated by the user, the mobile phone may display the example user interface 14 shown in FIG. 3E.

Figure 3H:
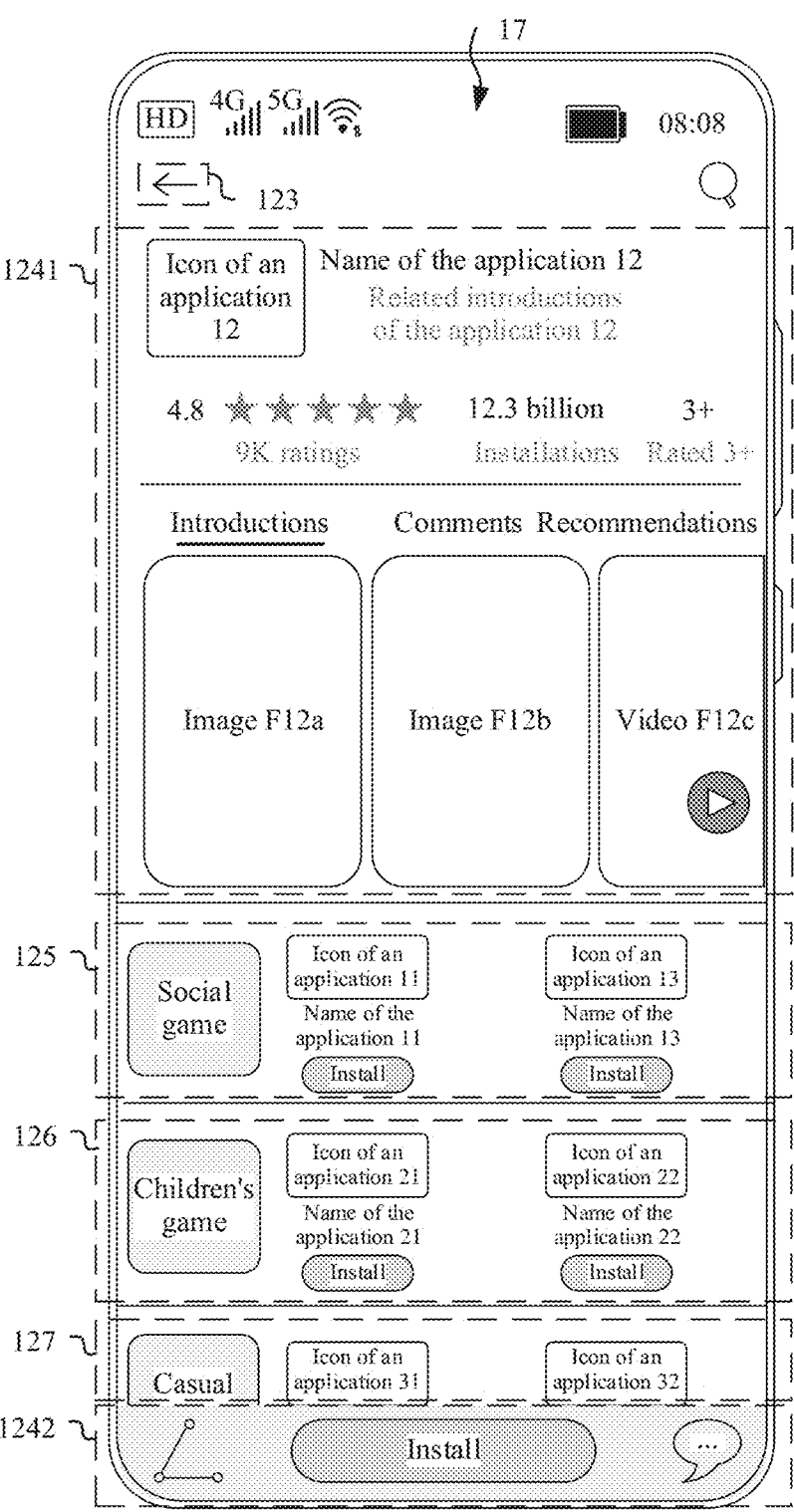
Figure 31:
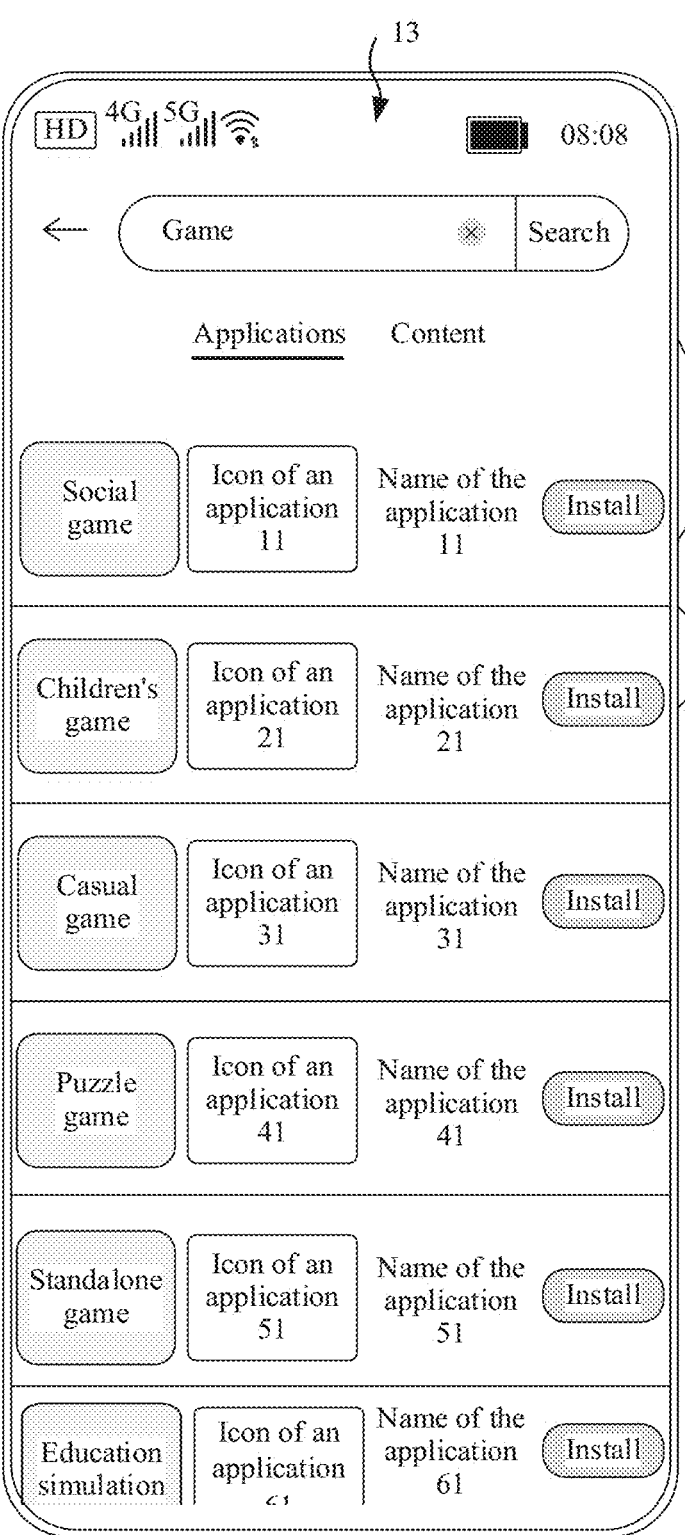

In addition, after detecting an operation that is of viewing the application 12 (for example, performing a tap operation on the icon or the name of the application 12 shown in FIG. 3G) and that is indicated by the user, the mobile phone may display an example user interface 17 shown in FIG. 3H.

It can be learned that the electronic device may trigger, on a result page of any query word and/or on a details page of any application started through the result page of the any query word, display, in a tiled manner, of a plurality of applications of any tag type associated with the query word.

In this case, the electronic device may provide, for the user, a plurality of entries for viewing applications of a specific tag type. In this way, after receiving an operation of viewing the applications of the specific tag type by the user, the electronic device may display a plurality of applications of the tag type in a tiled manner on the expanded page, so that the user can quickly search for an application.

After detecting an operation of viewing the application 12 (for example, performing a tap operation on the control 1053 shown in FIG. 3D, or performing a tap operation on the name or an image of the application 12 shown in FIG. 3E, or performing a tap operation on the name or an image of the application 12 shown in FIG. 3F) and that is indicated by the user, the mobile phone may display the example user interface 17 shown in FIG. 3H. The user interface 17 may be a user interface of the Application market application, and the user interface 17 is used to display details about the application 12. In addition, the user interface 17 may be considered as a details page of the application 12.

In FIG. 3H, the user interface 17 may include a control 123, an area 1241, and an area 1242.

The control 123 is used to provide an entry for returning to a user interface (namely, the user interface 13 shown in FIG. 3D or the user interface 14 shown in FIG. 3E) on which entering of the user interface 17 shown in FIG. 3H is triggered.

The area 1241 is used to display the details about the application 12, for example, one or more of an icon, a name, another description, a rating score, a rating level, a quantity of rating users, a download quantity, life duration, a function interface, comment information, a recommendation description, a function description, a function introduction, a developer, and the like.

The area 1242 is used to provide an entry for sharing the application 12, installing, updating, or starting the application 12, viewing the comment information of the application 12, or the like.

In addition, in addition to the foregoing content, the user interface 17 shown in FIG. 3H is further used to continue to display a result of searching for the query word. The result that is of searching for the query word and that is recommended on the user interface 17 shown in FIG. 3H is the same as or similar to that is recommended on the user interface 13 shown in FIG. 3D.

In consideration of a case in which an area that can be displayed on the user interface 17 shown in FIG. 3H is limited, in addition to the application 12, one or more applications having the same tag type as the application 12 may be recommended on the user interface 17. In addition, one or more applications of another tag type in addition to the tag type of the application 12 in the game category may be further recommend on the user interface 17. Applications of a plurality of tag types and a display sequence of the applications of the tag types that are recommended on the user interface 17 shown in FIG. 3H are the same as those that are recommended on the user interface 13 shown in FIG. 3D.

In addition, the user interface 17 is further used to recommend an entry of an application of another tag type in addition to the tag types of the displayed applications in the game category. In some embodiments, w % ben detecting an operation that is performed on the application of the another tag type on the user interface 17 (for example, performing an operation like sliding left/right/up/down on the user interface 17) and that is indicated by the user, the mobile phone may recommend the application of the another tag type on the user interface 17.

In some embodiments, the user interface 17 shown in FIG. 3H may further include an area 125, an area 126, and an area 127.

The area 125 is used to recommend one or more applications other than the application 12 corresponding to the social game. A specific implementation of the area 125 is similar to the implementation in the descriptions of the area 105 shown in FIG. 3D or the implementation in the descriptions of the area 113 shown in FIG. 3E.

The area 126 is used to recommend one or more applications corresponding to the children's game. A specific implementation of the area 126 is similar to the implementation in the descriptions of the area 106 shown in FIG. 3D or the implementation in the descriptions of the area 114 shown in FIG. 3E.

The area 127 is used to recommend one or more applications corresponding to the casual game. A specific implementation of the area 127 is similar to the implementation in the descriptions of the area 107 shown in FIG. 3D or the implementation in the descriptions of the area 115 shown in FIG. 3E.

In addition, because the user wants to view the details page of the application 12, and the user performs a trigger operation on the control 1053 in the area 105, the tag type of the application 12 is before other tag types, and sorting of the other tag types is still the sorting in FIG. 3D.

It can be learned that, in FIG. 3D, sorting 1 of the area 105, the area 106, and the area 107 is that the area 105 is before the area 106, and the area 106 is before the area 107. In FIG. 3H, sorting 4 of the area 125, the area 126, and the area 127 is that the area 125 is before the area 126, and the area 126 is before the area 127.

In addition, because the user wants to view the details page of the application 12, and the user performs a trigger operation on the name or the icon of the application 12 in the area 113, the tag type of the application 12 is before other tag types, and sorting of the other tag types is still the sorting in FIG. 3E.

It can be learned that, in FIG. 3E, sorting 2 of the area 113, the area 114, and the area 115 is that the area 113 is before the area 114, and the area 114 is before the area 115. In FIG. 3H, sorting 4 of the area 125, the area 126, and the area 127 is that the area 125 is before the area 126, and the area 126 is before the area 127.

In addition, because the user wants to view the details page of the application 12, and the user performs a trigger operation on the name or the icon of the application 12 in the area 119, the tag type of the application 12 is before other tag types, and sorting of the other tag types is still the sorting in FIG. 3E.

It can be learned that, in FIG. 3F, sorting 3 of the area 118, the area 119, and the area 120 is that the area 118 is before the area 119, and the area 119 is before the area 120. In FIG. 3H, sorting 4 of the area 125, the area 126, and the area 127 is that the area 125 is before the area 126, and the area 126 is before the area 127.

It can be learned that after receiving an operation of viewing a specific application by the user on a result page of any query word, the electronic device may display details about the application on a details page of the application, and continue to recommend, on the details page of the application, applications of a plurality of tag types associated with the query word. The plurality of tag types are different tag types in a same category, or the plurality of tag types are different tag types in different categories; and/or after receiving an operation of viewing another application by the user on the details page of the application, the electronic device may display details about the another application on a details page of the another application, and continue to recommend, on the details page of the another application, applications of a plurality of tag types associated with the query word. The plurality of tag types are different tag types in a same category, or the plurality of tag types are different tag types in different categories.

In this way, the applications of the plurality of tag types are continuously displayed in a stacked manner.

Figure 4:
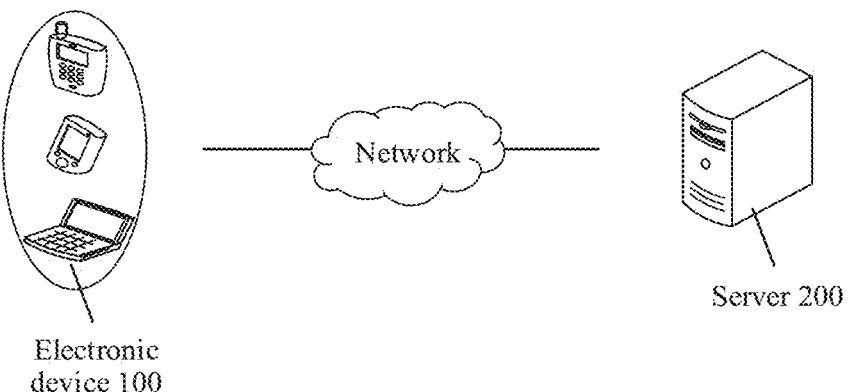
FIG. 4 is a schematic diagram of an architecture of a communication system according to an embodiment of this application.

FIG. 4 is a schematic diagram of an architecture of a communication system according to an embodiment of this application.

As shown in FIG. 4, the communication system 10 in this application may include an electronic device 100 and a server 200.

For a specific implementation of the electronic device 100, refer to the descriptions in FIG. 1 and FIG. 2. Details are not described herein again.

The server 200 may be an independent physical server, a server cluster or a distributed system including a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (content delivery network, CDN), big data, and an artificial intelligence platform.

The electronic device 100 may be directly or indirectly connected to the server 200 in a wired or wireless communication manner. The wired communication manner may be a coaxial cable, an optical fiber, a digital subscriber line (digital subscriber line, DSL), or the like. The wireless communication manner may be Bluetooth, infrared, Wi-Fi (Wi-Fi), microwave, or the like.

In some embodiments, a network may be used as a medium for communication between the electronic device 100 and the server 200. The network may be a wide area network, a local area network, or a combination thereof. For example, this application may be implemented by using a cloud technology (cloud technology). The cloud technology is a hosting technology in which a series of resources such as hardware, software, and a network are unified in the wide area network or the local area network, to implement data computing, storage, processing, and sharing.

The electronic device 100 is configured to: run various applications, request, from the server 200, display content of any user interface, for example, one or more of a result page of search content, a details page of an application, and an expanded page of an application of any tag type that are mentioned above; and obtain the requested display content of the user interface from the server 200.

The server 200 is configured to: receive information such as the search content, an identifier of an application, and an instruction from the electronic device 100; and transmit the requested display content of the user interface to the electronic device 100.

In some embodiments, the electronic device 100 may run an application market application. The server 200 may be a background search engine of the application market application.

In this application, the server 200 may cluster, according to a category (which may also be referred to as a leaf category (leaf category))-tag (tag) cluster rule and by using three phases: a data preparation phase, an application tagging phase, and an application cluster phase, each application into applications of a tag type corresponding to a specific category. The foregoing process may be referred to as a tag cluster (tag cluster) process. That is, application cluster is performed based on a tag of an application. The foregoing tag type may be understood as a cluster type of a tag. In addition, the tag type may be represented by a name of a tag.

Each application may include one or more tags (or attribute information). It can be learned that a tag is a more fine-grained attribute classification phrase than a category. In addition, a correlation score may be set for each tag. The correlation score indicates an association degree between a tag and a corresponding application.

1. Data Preparation Phase

In the phase, the server 200 may construct the category-tag cluster rule based on an application distribution field, that is, obtain various categories and various tag types in each category. A same category includes different tag types.

In the category-tag cluster rule, all applications may be considered as applications in the various categories, and applications in each category may be refined to applications of various tag types.

In this application, categories and tag types that are of the applications may be classified in a coarse-grained or fine-grained classification manner.

For example, a game category may include a social game, a children's game, a casual game, a puzzle game, a stand-alone game, an education simulation game, and another tag type.

Based on the foregoing descriptions, the server 200 may construct the category-tag cluster rule based on experience and knowledge accumulation of a developer.

Alternatively, the server 200 may construct the category-tag cluster rule by unearthing a keyword in a text.

For example, the server 200 may use description content of all applications in a same leaf category as a text, and extract keywords as tag types in the leaf category from the text according to an unsupervised keyword extraction algorithm (for example, a yet another keyword extractor, YAKE). In this way, the server 200 may construct the category-tag cluster rule.

According to the category-tag cluster rule, a structure relationship shown in Table 1 may be formed: level-1 category-level-2 category-level-3 category (leaf category)-tag type. In Table 1, the leaf category is the level-3 category.

The level-1 category may be understood as a general term, for example, a file, a picture, and an application. The level-2 category may be understood as a subdivision of the level-1 category. The level-3 category may be understood as a subdivision of the level-2 category. The tag type may be understood as a subdivision of the level-3 category.

TABLE 1

| Level-1 category | Level-2 category | Level-3 category (leaf category) | Tag type |
|---|---|---|---|
| Application | Social communication | Chat | Work chat |
| Application | Social communication | Chat | Life chat |
| Application | Role play | Game | Ancient costume game |
| . . . | . . . | . . . | . . . |

According to Table 1, any application may form a structure relationship shown in Table 2: leaf category-name of an application-identifier of an application-tag type.

TABLE 2

| Leaf category | Name of an application | Identifier of an application | Tag type |
|---|---|---|---|
| Chat | Name of an application 1 | 001 | Work chat |
| Chat | Name of an application 2 | 002 | Life chat |
| Game | Name of an application 3 | 003 | Ancient costume game |
| . . . | . . . | . . . | . . . |

In this case, tag types in a chat category may include work chat, life chat, and the like. Tag types in a game category may include the ancient costume game and the like.

In this way, the server 200 may construct and store the category-tag cluster rule.

2. Application Tagging Phase

In the phase, the server 200 may tag each application, that is, obtain a tag of each application.

For any application, the server 200 may tag the application based on a tag (an attribute) of the application uploaded by the developer.

Alternatively, the server 200 may tag the application based on description content of the application. For example, the server 200 may perform keyword extraction on the description content of the application, to obtain the tag of the application.

Alternatively, the server 200 may tag the application by using a classification prediction model with reference to the tag or the description content of the application. In addition, the server 200 may further perform correlation calculation on the application by using the classification prediction model with reference to the tag or the description content of the application, to obtain a correlation score of each tag.

The classification prediction model may be, for example, a BERT model (bidirectional encoder representations from transformer) or a shallow-layer network model (for example, a FastText model).

With reference to Table 1 and Table 2, the server 200 may learn that a tag type of the application 1 is the work chat in the chat category, a tag type of the application 2 is the life chat in the chat category, and a tag type of the application 3 is the ancient costume game in the game category.

In this way, the server 200 may obtain tag types of the various applications.

3. Application Cluster Phase

In the phase, the server 200 may cluster tags of a plurality of applications according to the category-tag cluster rule. That is, applications with tags having a same name or same semantics are clustered into one type, namely, a same tag type.

In addition, because each application may include a plurality of tags, the server 200 may cluster N tags of the plurality of applications. Herein. N is a positive integer. For example, the N tags may be first N tags in descending order of correlation scores.

With reference to Table 1 and Table 2, the server 200 may cluster the application 1 into applications corresponding to the work chat in the chat category, cluster the application 2 into applications corresponding to the life chat in the chat category, and cluster the application 3 into applications corresponding to the ancient costume game in the game category.

In this way, the server 200 may cluster each application in an application library into applications of a corresponding tag type.

A cluster result of each application may be shown in Table 3.

TABLE 3

| Tag type | Name of an application | Identifier of an application |
|---|---|---|
| Work chat | Name of an application 1 | 001 |
|  | Name of an application 4 | 0011 |
|  | Name of an application 5 | 0012 |
| Life chat | Name of an application 2 | 002 |
|  | Name of an application 6 | 0021 |
|  | Name of an application 7 | 0022 |
| Ancient costume game | Name of an application 3 | 003 |
|  | Name of an application 8 | 0031 |
|  | Name of an application 9 | 0032 |
| . . . | . . . | . . . |

Based on the foregoing descriptions, for any application, a name, an identifier, and a tag type of the application are associated with each other.

After receiving the search content sent by the electronic device 100, the server 200 may analyze semantics of the search content, to obtain a plurality of tag types associated with the search content and an application of each tag type.

The plurality of tag types may be different tag types in a same category. Alternatively, the plurality of tag types may be different tag types in different categories.

In this way, the server 200 may provide, for the electronic device 100, a source of the display content of the any user interface, such as the result page of the search content, the details page of the application, and the expanded page of the application of the any tag type that are mentioned above.

Figure 5A:
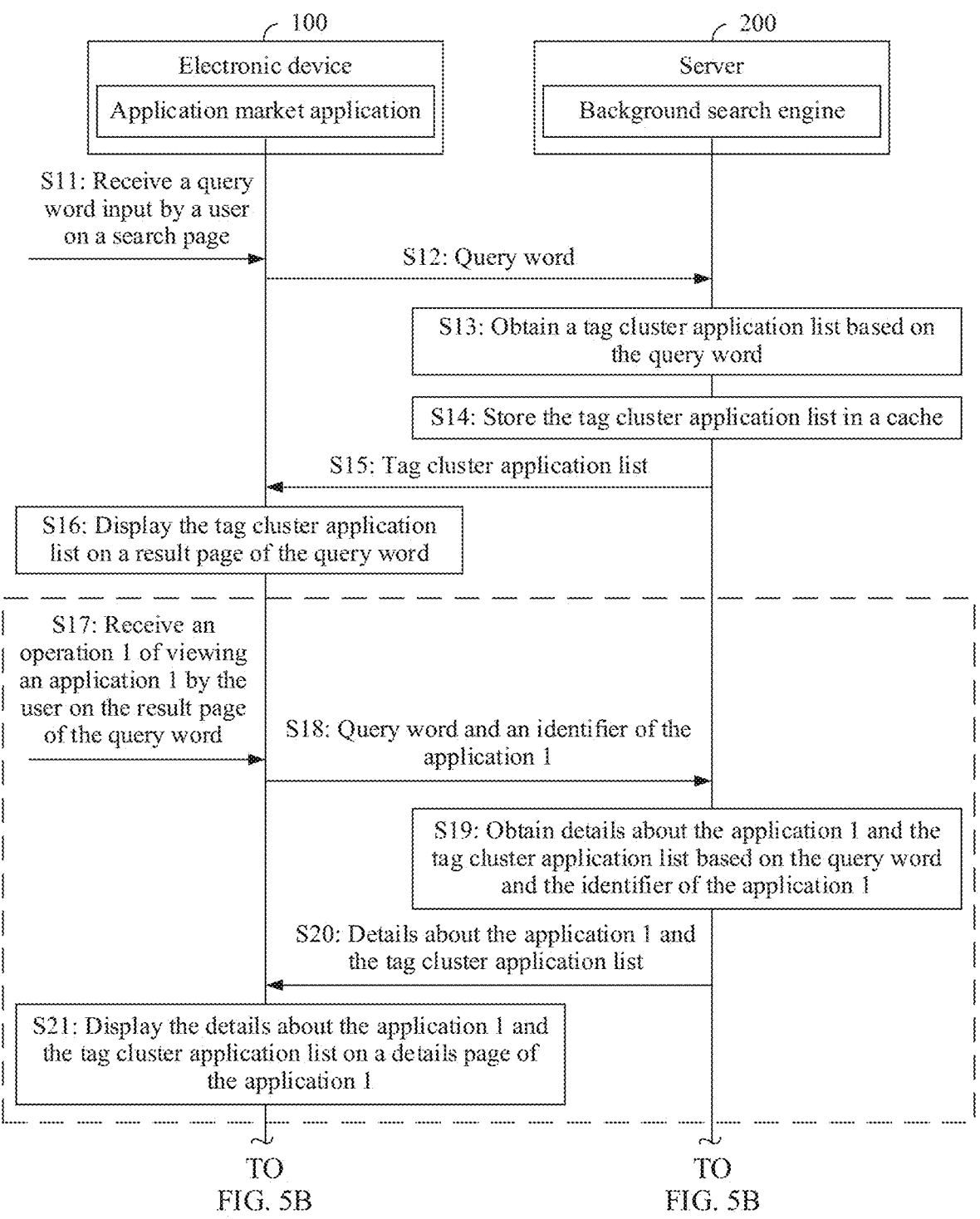
FIG. 5A and FIG. 5B are a signaling interaction diagram of an application recommendation method according to an embodiment of this application.
Figure 5B:
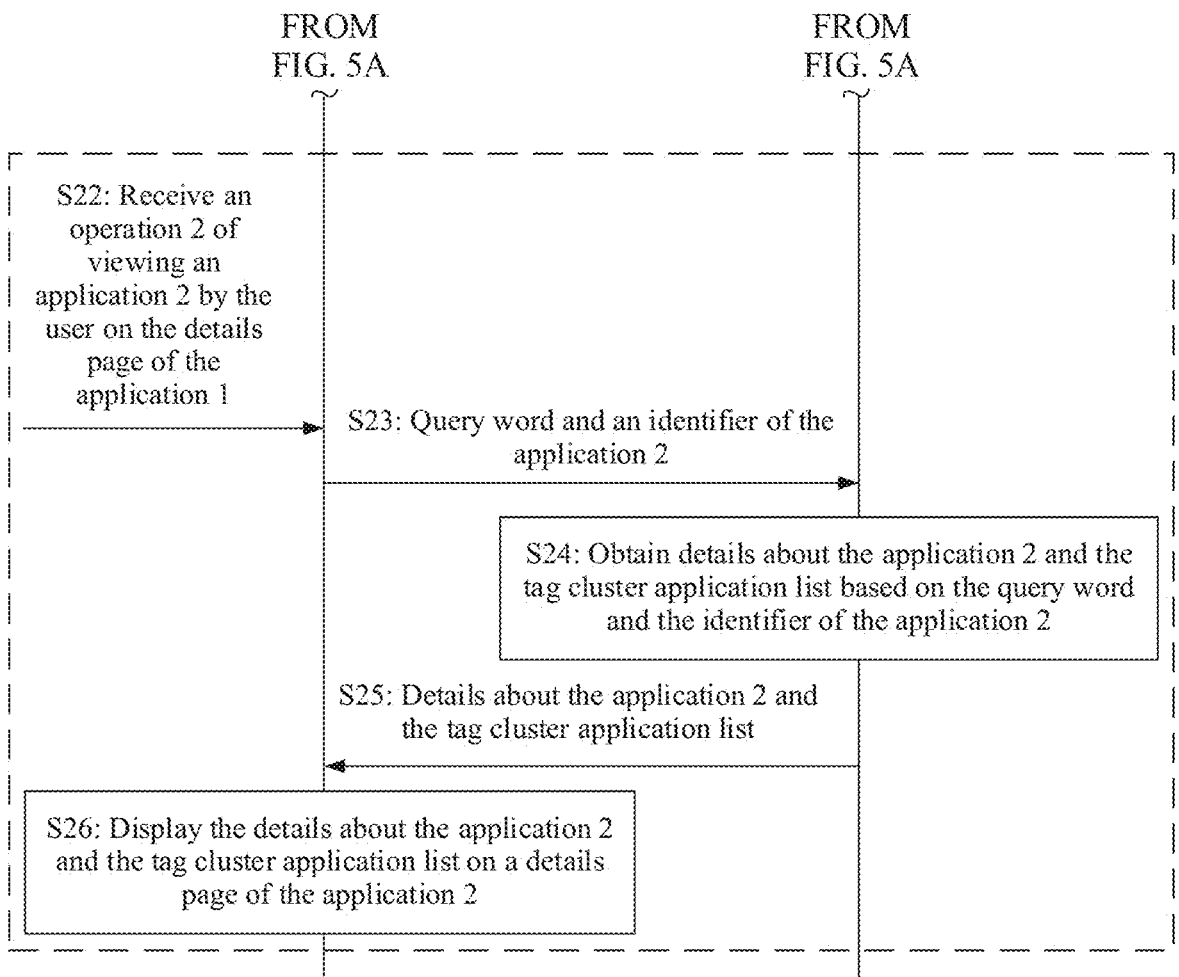

With reference to FIG. 5A and FIG. 5B, the following describes, by using the electronic device 100 and the server 200 that have the structure shown in FIG. 4 as an example, a detailed process in which the electronic device 100 and the server 200 implement the application recommendation method in this application.

The application recommendation method in this application may be applied to a scenario in which a user discovers an application, so that the user can discover or compare applications of a specific type or applications of some types, and the user is attracted to continuously discover an application. This improves search experience of the user.

FIG. 5A and FIG. 5B are a signaling interaction diagram of an application recommendation method according to an embodiment of this application.

As shown in FIG. 5A and FIG. 5B, the application recommendation method in this application may include the following steps.

S11: An electronic device receives a query word input by a user on a search page.

The search page is a user interface of an application market application on the electronic device. The query word may indicate classified applications that the user expects to find. Generally, the query word is a fuzzy query (fuzzy query) word, namely, a query word without an explicit intention, for example, a game or a video.

In addition, an input manner of the query word is not limited in this application. For example, the user may input the query word in a form of a text, a character, a picture, or the like on the search page. Alternatively, the user may input the query word by voice on the search page. Alternatively, the user may tap the query word displayed on the search page.

S12: The electronic device sends the query word to a server.

S13: The server obtains a tag cluster application list based on the query word.

The tag cluster application list is used to display a plurality of tag types associated with the query word, and description content of one or more applications corresponding to each tag type.

The plurality of tag types may belong to a same category, or may belong to different categories. This is not limited in this application.

Description content of each application may include one or more of an icon, a name, related introductions (such as an application description, a download quantity, a rating level, and a function interface), and the like of the application.

In some embodiments, the tag cluster application list may include the plurality of tag types, and a name and an icon of an application corresponding to each tag type.

In addition, the tag cluster application list may further include a control 1 of each application. The control 1 is used to provide an entry for installing, updating, or starting the application. For example, when an application is not installed on a mobile phone, the control 1 may be used to trigger downloading and installation of the application. When an application of a non-latest version is installed on a mobile phone, the control 1 may be used to trigger updating of the application. When an application of a latest version is installed on a mobile phone, the control 1 may be used to trigger starting of the application. In addition, display parameters such as a location, a size, a shape, a layout, and a color of the control 1 are not limited in this application.

A quantity of tag types may be 2, 3, or another quantity. A quantity of applications of each tag type may be 1, 2, or another quantity.

In addition, the tag cluster application list may further include a control 2 of each tag type. The control 2 is used to provide an entry for displaying a plurality of applications of the tag type in a tiled manner. Display parameters such as a location, a size, a shape, a layout, and a color of the control 2 are not limited in this application.

In addition, the tag cluster application list may further include a text 1 of each tag type. The text 1 is used to display the tag type. Display parameters such as content, a location, a size, a shape, a layout, and a color of the text 1 are not limited in this application.

In addition, the control 2 and the text 1 may be a same control. The control is used to provide all applications of the tag type, and is further used to display the tag type.

Based on the foregoing descriptions, the server may obtain the tag cluster application list in a plurality of manners.

In some embodiments, the server may predict the tag types associated with the query word, to obtain a tag type prediction result.

The tag type prediction result indicates the plurality of tag types associated with the query word. For example, the plurality of tag types may be different tag types in a same category, or the plurality of tag types may be different tag types in different categories.

Different tag types in a same category are used as an example. It is assumed that the tag types in the tag type prediction result include a children's game, a social game, a casual game, and the like in the game category. In this case, an output form of the tag type prediction result may be represented by the following code.

```
{
"keyword": "Game",
"count": 3,
"tag": [
    {
    "name": "Children's game",
    "score": 0.8,
    },
    {
    "name": "Social game",
    "score": 0.7,
    },
    }
    "name": "Casual game",
    "score": 0.6,
    },
    {
    "name": "Education simulation game",
    "score": 0.5,
    },
  ]
}
```

Herein, "score" indicates a correlation score of each tag type.

The correlation score of each tag type may be used to determine sorting of each tag type. Sorting of each tag type is related to a historical operation behavior of each tag type. A historical operation behavior for any tag type may include but is not limited to a quantity of accumulated historical operations for viewing the tag type by the user. This can indicate a degree of interest of the user in the tag type. For example, N tags may be first N tags in descending order of correlation scores. Further, the server may obtain an application recall list from an application information base (for example, ElasticSearch) based on the tag type prediction result.

The application recall list may include an identifier, a name, a tag, and the like of an application of each tag type.

It is assumed that the output form of the foregoing code is used in the tag type prediction result. In this case, an output form of the application recall list may be represented by the following code.

```
{
"keyword": "Game",
"count": 3,
"apps": [
    {
    "id": "001",
    "name": "Children's game APP 1",
    "tag": Children's game,
    },
    {
    "id": "002",
    "name": "Social game APP 1",
    "tag": Social game,
    },
    {
    "id": "003",
    "name": "Casual game APP 1",
    "tag": Casual game,
    },
    {
    "id": "004",
    "name": "Education simulation game APP 1",
    "tag": Education simulation game,
    },
  ]
}
```

Further, the server may sort the plurality of tag types based on the application recall list, to obtain the tag type prediction result.

An output form of the tag type prediction result may be represented by the following code.

```
{
    "keyword": "Game",
    "count": 3,
    "apps": [
        {
            "id": "001",
            "name": "Children's game APP 1",
            "tag": Children's game,
            "score": 0.9.
        },
        {
            "id": "002",
            "name": "Social game APP 1",
            "tag": Social game,
            "score": 0.8,
        },
        {
            "id": "003".
            "name": "Casual game APP 1",
            "tag": Casual game,
            "score": 0.7,
        },
        {
            "id": "004",
            "name": "Education simulation game APP 1",
            "tag": Education simulation game,
            "score": 0.6,
        },
    ]
}
```

Herein, "score" indicates a sorting score of each tag type.

The server may sort applications of the plurality of tag types in a manner like coarse sorting or refined sorting.

In some embodiments, the server may obtain a sorting score of each tag type based on a correlation score of each tag type and popularity of an application of each tag type.

Sorting of each tag type is further related to the popularity of the application of each tag type. The popularity of the application may be represented by one or more of an installation quantity (namely, a download quantity), a rating score, and a click-through rate.

In this way, the server may sort the plurality of tag types in descending order based on the sorting score of each tag type.

In addition to the foregoing implementation, the server may sort the plurality of tag types based on sorting of each tag type or popularity of an application of each tag type.

In addition, the server may further sort, based on popularity of each application of any tag type, a plurality of applications corresponding to the tag type.

In some embodiments, the server may obtain a sorting score of each application of the tag type based on popularity of each application of the tag type.

In this way, the server may sort the plurality of applications of the tag type in descending order based on the sorting score of each application of the tag type.

S14: The server stores the tag cluster application list in a cache. In this way, subsequent query can be accelerated.

It should be understood that, in addition to the cache, the server may store the tag cluster application list in other storage space. This is not limited in this application.

S15: The server sends the tag cluster application list to the electronic device.

It should be understood that S14 and S15 are performed in any time sequence. In addition, S14 and S15 may be performed simultaneously, or may be performed sequentially.

S16: The electronic device displays the tag cluster application list on a result page of the query word. In this way, it is convenient for the user to browse and select an application.

In addition, the query word may also indicate a determined or specific application. In this case, the electronic device may further display, on the result page of the query word, the tag cluster application list and information such as a name and an icon of the application.

In some embodiments, for the query word, refer to the descriptions of the query word "Game" shown in FIG. 3B to FIG. 3D. For the result page of the query word, refer to the descriptions of the user interface 13 shown in FIG. 3D. For the tag cluster application list, refer to the descriptions of the area 105, the area 106, the area 107, the area 108, the area 109, and the area 110 in the user interface 13 shown in FIG. 3D. For description content 1 of an application of each tag type, refer to the descriptions such as the description content of the application 11 in the area 1051, the description content of the application 21 in the area 1061, description content of the application 31 in the area 107, description content of the application 41 in the area 108, description content of the application 51 in the area 109, and description content of the application 61 in the area 110 shown in FIG. 3D. For the control 1 of the application of each tag type, refer to the descriptions such as the control 1052 and the control 1062 shown in FIG. 3D. For the control 2 and the text 1 of each tag type, refer to the descriptions such as the control 1054 and the control 1064 shown in FIG. 3D.

In conclusion, when the user inputs the query word on the search page for search, the electronic device may hierarchically display clustered applications on the result page of the query word based on the plurality of tag types associated with the query word.

In this way, the clustered applications of the plurality of tag types are clearly displayed to the user, so that the user can discover or compare applications of a specific type or applications of some types, and the user can be attracted to continuously discover an application. This improves search experience of the user.

S17: The electronic device receives an operation 1 of viewing the application 1 by the user on the result page of the query word.

The operation 1 is used to trigger display of a details page of the application 1. The operation 1 mentioned in this application may include an operation triggered on description content such as an icon, a name, and an image (for example, a picture or a video animation) of the application 1. The operation 1 may be touching and holding, tapping, double-tapping, sliding, or the like.

In some embodiments, for the result page of the query word, refer to the descriptions of the user interface 13 shown in FIG. 3D. For the application 1, refer to the descriptions of the application 11 shown in FIG. 3D. For the operation 1, refer to the descriptions of the tap operation performed on the control 1051 shown in FIG. 3D.

In some other embodiments, for the result page of the query word, refer to the descriptions of the user interface 13 shown in FIG. 3D. For the application 1, refer to the descriptions of the application 21 shown in FIG. 3D. For the operation 1, refer to the descriptions of the tap operation performed on the control 1061 shown in FIG. 3D.

In some other embodiments, for the result page of the query word, refer to the descriptions of the user interface 13 shown in FIG. 3D. For the application 1, refer to the descriptions of the application 12 shown in FIG. 3H. For the operation 1, refer to the descriptions of the tap operation performed on the control 1053 shown in FIG. 3H.

S18: The electronic device sends the query word and an identifier of the application 1 (for example, an identifier "id" of the foregoing application) to the server.

S19: The server obtains details about the application 1 and the tag cluster application list from the cache and a relational database management system database (for example, a MySQL database) based on the query word and the identifier of the application 1.

The MySQL database stores details about various applications. Details about any application may include one or more of an icon, a name, another description, a rating score, a rating level, a quantity of rating users, a download quantity, life duration, a function interface, comment information, a recommendation description, a function description, a function introduction, a developer, and the like of the application.

It should be understood that, in addition to the MySQL database, the server may store details about each application into another database. This is not limited in this application.

S20: The server sends the details about the application 1 and the tag cluster application list to the electronic device.

S21: The electronic device displays the details about the application 1 and the tag cluster application list on the details page of the application 1.

Another application having the same tag type as the application 1 than the application 1 is displayed on the details page of application 1, and an application of another tag type is displayed on the details page of the application 1.

In some embodiments, for the details page of the application 1, refer to the descriptions of the user interface 14 shown in FIG. 3E. For the details about the application 1, refer to the descriptions of the details about the application 11 that are in the area 1121 and the area 1122 shown in FIG. 3E. For the tag cluster application list, refer to the descriptions of the area 113, the area 114, and the area 115 shown in FIG. 3E.

In some other embodiments, for the details page of the application 1, refer to the descriptions of the user interface 15 shown in FIG. 3F. For the details about the application 1, refer to the descriptions of the details about the application 21 that are in the area 1171 and the area 1172 shown in FIG. 3F. For the tag cluster application list, refer to the descriptions of the area 118, the area 119, and the area 120 shown in FIG. 3F.

In some other embodiments, for the details page of the application 1, refer to the descriptions of the user interface 17 shown in FIG. 3H. For the details about the application 1, refer to the descriptions of the details about the application 12 that are in the area 1241 and the area 1242 shown in FIG. 3H. For the tag cluster application list, refer to the descriptions of the area 125, the area 126, and the area 127 shown in FIG. 3H.

In conclusion, when the user views a specific application on the result page of the query word, the electronic device may display details about the application on a details page of the application, and continue to hierarchically display clustered applications based on the plurality of tag types associated with the query word.

In this way, the electronic device does not need to return to the search page for search again, and hierarchically displays, over and over again, the clustered applications based on the plurality of tag types associated with the query word, so that the user can obtain immersive search experience.

S22: The electronic device receives an operation 2 of viewing the application 2 by the user on the details page of the application 1.

The operation 2 is used to trigger display of a details page of the application 2. The operation 2 mentioned in this application may include an operation triggered on description content such as an icon, a name, and an image (for example, a picture or a video animation) of the application 2. The operation 2 may be touching and holding, tapping, double-tapping, sliding, or the like.

S23: The electronic device sends the query word and an identifier of the application 2 to the server.

S24: The server obtains details about the application 2 and the tag cluster application list from the cache and a relational database management system database (for example, a MySQL database) based on the query word and the identifier of the application 2.

S25: The server sends the details about the application 2 and the tag cluster application list to the electronic device.

S26: The electronic device displays the details about the application 2 and the tag cluster application list on the details page of the application 2.

Implementations of S22 to S26 are respectively similar to those of S17 to S21 in the embodiment m FIG. 5A and FIG. 5B. Details are not described herein again in this application.

In some embodiments, for the details page of the application 1, refer to the descriptions of the user interface 14 shown in FIG. 3E. For the application 2, refer to the descriptions of the application 21 shown in FIG. 3E. For the operation 2, refer to the descriptions of the tap operation performed on the name or the icon of the application 21 shown in FIG. 3E. For the details page of the application 2, refer to the descriptions of the user interface 15 shown in FIG. 3F. For the details about the application 2, refer to the descriptions of the details about the application 21 that are in the area 1171 and the area 1172 shown in FIG. 3F. For the tag cluster application list, refer to the descriptions of the area 118, the area 119, and the area 120 shown in FIG. 3F.

In some other embodiments, for the details page of the application 1, refer to the descriptions of the user interface 14 shown in FIG. 3E. For the application 2, refer to the descriptions of the application 12 shown in FIG. 3E. For the operation 2, refer to the descriptions of the tap operation performed on the control 1053 shown in FIG. 3E. For the details page of the application 2, refer to the descriptions of the user interface 17 shown in FIG. 3H. For the details about the application 2, refer to the descriptions of the details about the application 12 that are in the area 1241 and the area 1242 shown in FIG. 3H. For the tag cluster application list, refer to the descriptions of the area 125, the area 126, and the area 127 shown in FIG. 3H.

In some other embodiments, for the details page of the application 1, refer to the descriptions of the user interface 15 shown in FIG. 3F. For the application 2, refer to the descriptions of the application 12 shown in FIG. 3F. For the operation 2, refer to the descriptions of the tap operation performed on the name or the icon of the application 12 shown in FIG. 3F. For the details page of the application 2, refer to the descriptions of the user interface 17 shown in FIG. 3H. For the details about the application 2, refer to the descriptions of the details about the application 12 in the area 1241 and the area 1242 shown in FIG. 3H. For the tag cluster application list, refer to the descriptions of the area 125, the area 126, and the area 127 shown in FIG. 3H.

In conclusion, when the user views another application on a details page of a specific application, the electronic device may display details about the application on the details page of the another application, and continue to hierarchically display clustered applications based on the plurality of tag types associated with the query word.

In this way, the electronic device does not need to return to the search page for search again, and hierarchically displays, over and over again, the clustered applications based on the plurality of tag types associated with the query word, so that the user can obtain immersive search experience.

Based on some of the foregoing embodiments, the following describes an application recommendation method provided in this application.

For example, this application provides an application recommendation method.

The application recommendation method in this application may be performed by an electronic device. For a specific implementation of the electronic device, refer to the descriptions of the electronic device mentioned in FIG. 1 to FIG. 5A and FIG. 5B. Details are not described herein again.

FIG. 6 is a schematic flowchart of an application recommendation method according to an embodiment of this application.

As shown in FIG. 6, the application recommendation method in this application may include the following steps.

S101; Receive search content input on a first interface of an application market application.

The application market application may be installed on an electronic device, and the electronic device may run the application market application. The application market application may be used to provide an entry for searching for, installing, updating, and starting an application. In some embodiments, the application market application may be an application on a mobile phone mentioned in the embodiments in FIG. 3A to FIG. 3I. Alternatively, the application market application may be an application on the electronic device mentioned in the embodiment in FIG. 5A and FIG. 5B.

The first interface is a user interface of the application market application. The first interface is used to provide an entry for searching for various applications. A specific implementation of the first interface is not limited in this application. For example, the first interface may be the user interface 12 mentioned in the embodiments in FIG. 3B to FIG. 3C; or the first interface may be the query word mentioned in the embodiment in FIG. 5A and FIG. 5B.

The search content may indicate classified applications that a user expects to find. The search content may express a fuzzy search intention of the user, or a specific application that the user wants to search for. For example, the search content may be the query word "Game" mentioned in the embodiments in FIG. 3A to FIG. 3I; or the first interface may be the query word mentioned in the embodiment in FIG. 5A and FIG. 5B. In addition, the search content may be input on the first interface in a form of a voice, a text, a picture, a video, or the like.

For a specific implementation of S101, refer to descriptions in the embodiments in FIG. 3A to FIG. 3C and the descriptions of S11 in the embodiment in FIG. 5A and FIG. 5B. Details are not described herein again.

S102: Display a second interface of the application market application in response to the search content, where the second interface includes a first tag type, a second tag type, first application information, and second application information, the first application information includes a name and an icon of a first application, the second application information includes a name and an icon of a second application, a tag type of the first application is the first tag type, a tag type of the second application is the second tag type, and the first tag type is different from the second tag type.

The second interface is a user interface of the application market application. The second interface is used to display various applications related to the search content. A specific implementation of the second interface is not limited in this application. For example, the second interface may be the user interface 13 mentioned in the embodiment in FIG. 3D or FIG. 3I; or the second interface may be the result page of the query word mentioned in the embodiment in FIG. 5A and FIG. 5B.

Both the first tag type and the second tag type are tag types of the applications. For the first tag type and the second tag type, refer to the descriptions of the foregoing tag types. The first tag type is different from the second tag type. In other words, an application corresponding to the first tag type is usually different from an application corresponding to the second tag type.

The first tag type and the second tag type belong to a same category. Alternatively, the first tag type and the second tag type belong to different categories. The first tag type and the second tag type may be displayed in a form of a text, a picture, a control, or the like.

The first application information is information related to the first application, for example, the name and the icon of the first application. There may be one or more first applications. When there are a plurality of first applications, all tag types of the plurality of applications are the first tag type. The second application information is information related to the second application, for example, the name and the icon of the second application. There may be one or more second applications. When there are a plurality of second applications, all tag types of the plurality of applications are the second tag type.

For example, the first tag type may be the social game mentioned in the embodiment in FIG. 3D or FIG. 3I, and the first application is the application 11 mentioned in the embodiment in FIG. 3D or FIG. 3I, or the application 11 and the application 12. The second tag type may be the children's game mentioned in the embodiment in FIG. 3D or FIG. 3I, and the second application is the application 21 mentioned in the embodiment in FIG. 3D or FIG. 3I, or the application 21 and the application 22. It should be understood that, in the foregoing content, specific implementations of the first tag type and the second tag type are interchangeable. Correspondingly, specific implementations of the first application and the second application are interchangeable.

Alternatively, the first tag type and the second tag type may be the plurality of tag types in the tag cluster application list mentioned in the embodiment in FIG. 5A and FIG. 5B, and the first application and the second application are the applications corresponding to the various tag types mentioned in the embodiment in FIG. 5A and FIG. 5B.

In addition, the first application information further includes a control of the first application. In this case, when the first application is not installed on the electronic device, after the electronic device receives a fourth operation performed on the control of the first application, the first application may be installed or updated on the electronic device.

A type of the fourth operation may include but is not limited to tapping, double-tapping, or touching and holding. A specific implementation of the control of the first application is not limited in this application. For example, the control of the first application may be the control 1052 or the control 1062 in the embodiment in FIG. 3D or FIG. 3I.

For a specific implementation of S102, refer to the descriptions in the embodiment in FIG. 3D or FIG. 3I and the descriptions of S16 in the embodiment in FIG. 5A and FIG. 5B. Details are not described herein again.

In conclusion, in response to the search content, the electronic device may display, on the second interface, a plurality of tag types and names and icons of one or more applications corresponding to each tag type. The plurality of tag types include two or more tag types.

In the application recommendation method provided in this application, the electronic device receives the search content input on the first interface of the application market application. The first tag type, the second tag type, the name and the icon of the first application corresponding to the first tag type, and the name and the icon of the second application corresponding to the second tag type may be displayed based on an association relationship between the search content and an application and/or a tag type. In this way, the user can hierarchically view applications of the plurality of tag types, to help attract the user to continue to view or download an application. Further, the user can compare the applications of the plurality of tag types, to help the user accurately distinguish between the applications and make quick selection. This improves user retrieval experience of application recommendation, and increases a conversion rate of application recommendation.

In addition, an application related to the search content may be further accurately recommended. This improves correlation of application recommendation, reduces probability of recommending an application unrelated to the search content, increases a query quantity, a click-through rate, and a download quantity of the recommended application, and brings better recommendation experience to the user.

The association relationship may be understood as that the first tag type and/or the second tag type are/is related to the search content; and/or that the first application information and the second application information are related to the search content. For the foregoing content, refer to the foregoing descriptions that the server clusters each application into applications of a tag type corresponding to a specific category, and analyzes semantics of the search content to obtain applications of a plurality of tag types associated with the search content.

The application market application mentioned in this application may be replaced with a web page version of the application market and/or an application market official account. For ease of description, the application market application is used as an example for illustration in this application.

Based on the foregoing descriptions, when displaying details about any application, the electronic device may continue to display the applications of the plurality of tag types associated with the search content.

In some embodiments, the application recommendation method in this application may further include the following steps.

Step 201: Receive a first operation performed on the first application information on the second interface.

The first operation performed on the first application information is used to trigger display of details about the first application. For example, the first operation may be an operation triggered on an icon or a name of the first application. A type of the first operation may include but is not limited to tapping, double-tapping, or touching and holding.

For example, the first operation performed on the first application information may be an operation triggered on the icon or the name of the application 11 on the user interface 13 mentioned in the embodiment in FIG. 3D or FIG. 3I; or the first operation performed on the first application information may be an operation triggered on the control 1053 on the user interface 13 mentioned in the embodiment in FIG. 3D or FIG. 3I; or the first operation performed on the first application information may be the operation 1 performed on the application 1 mentioned in the embodiment in FIG. 5A and FIG. 5B.

For a specific implementation of step 201, refer to the descriptions in the embodiment in FIG. 3D or FIG. 3I and the descriptions of S17 in the embodiment in FIG. 5A and FIG. 5B. Details are not described herein again.

Step 202: Display a third interface of the application market application in response to the first operation, where the third interface includes the details about the first application, the first tag type, the second tag type, third application information, and the second application information, the third application information includes a name and an icon of a third application, and a tag type of the third application is the first tag type The third interface is a user interface of the application market application. The third interface is used to display the details about the first application. A specific implementation of the third interface is not limited in this application.

For example, the third interface may be the user interface 14 mentioned in the embodiment in FIG. 3E; or the third interface may be the user interface 17 mentioned in the embodiment in FIG. 3H; or the third interface may be the details page of the application 1 mentioned in the embodiment in FIG. 5A and FIG. 5B. In other words, the third interface may be the details about the application 1 and the tag cluster application list in S21 that are mentioned in the embodiment in FIG. 5A and FIG. 5B.

For the details about the first application, refer to the descriptions of details about any application mentioned above.

For example, the details about the first application may be the details about the application 11 that are in the area 1121 and the area 1122 mentioned in the embodiment in FIG. 3E; or the details about the first application may be the details about the application 12 that are in the area 1241 and the area 1242 mentioned in the embodiment in FIG. 3H; or the details about the first application may be the details about the application 1 mentioned in the embodiment in FIG. 5A and FIG. 5B.

The third application information is information related to the third application, for example, the name and the icon of the third application. There may be one or more third applications. When there are a plurality of third applications, all tag types of the plurality of applications are the first tag type.

When the second interface is compared with the third interface, the first application information changes to the third application information, and content of the second application information does not change. In addition, a manner of displaying any piece of application information may change or may not change. This is not limited in this application.

For example, the first tag type may be the social game mentioned in the embodiment in FIG. 3D or FIG. 3I, the first application is the application 11 mentioned in the embodiment in FIG. 3D or FIG. 3I, and the third application is the application 12 mentioned in the embodiment in FIG. 3E, or the application 12 and the application 13. The second tag type may be the children's game mentioned in the embodiment in FIG. 3D or FIG. 3I, and the second application is the application 21 mentioned in the embodiments in FIG. 3D or FIG. 3I and FIG. 3E, or the application 21 and the application 22.

Alternatively, the first tag type may be the social game mentioned in the embodiment in FIG. 3D or FIG. 3I, the first application is the application 12 mentioned in the embodiment in FIG. 3D or FIG. 3I, and the third application is the application 11 mentioned in the embodiment in FIG. 3H, or the application 11 and the application 13. The second tag type may be the children's game mentioned in the embodiment in FIG. 3D or FIG. 3I, and the second application is the application 21 mentioned in the embodiments in FIG. 3D or FIG. 3I and FIG. 3E, or the application 21 and the application 22.

For a specific implementation of step 202, refer to the descriptions in the embodiments in FIG. 3E, FIG. 3F, and FIG. 3H and the descriptions of S21 in the embodiment in FIG. 5A and FIG. 5B. Details are not described herein again.

In conclusion, after receiving the operation of viewing any application in the first tag type on the second interface, the electronic device may display, on the third interface, details about the application, the first tag type, the second tag type, and names and icons of one or more applications corresponding to each tag type.

Based on the foregoing descriptions, when the second interface is compared with the third interface, a quantity of applications corresponding to the first tag type may change.

In addition to content in step 202, the third interface further includes fourth application information. The fourth application information includes a name and an icon of a fourth application, and a tag type of the fourth application is the first tag type.

The fourth application information is information related to the fourth application, for example, the name and the icon of the fourth application. There may be one or more fourth applications. When there are a plurality of fourth applications, all tag types of the plurality of applications are the first tag type.

For example, the first tag type may be the social game mentioned in the embodiment in FIG. 3D or FIG. 3I, the first application is the application 11 mentioned in the embodiment in FIG. 3D or FIG. 3I, the third application is the application 12 mentioned in the embodiment in FIG. 3E, and the fourth application is the application 13.

When the second interface is compared with the third interface, a quantity of applications corresponding to the second tag type may change.

In addition to the content in step 202, the third interface further includes fifth application information. The fifth application information includes a name and an icon of a fifth application, and a tag type of the fifth application is the second tag type.

The fifth application information is information related to the fifth application, for example, the name and the icon of the fifth application. There may be one or more fifth applications. When there are a plurality of fifth applications, all tag types of the plurality of applications are the second tag type.

For example, the second tag type may be the children's game mentioned in the embodiment in FIG. 3D or FIG. 3I, the second application is the application 21 mentioned in the embodiment in FIG. 3D or FIG. 3I, and the fifth application is the application 22 mentioned in the embodiment in FIG. 3E.

In some other embodiments, the application recommendation method in this application may further include the following steps.

Step 301: Receive a second operation performed on the second application information on the second interface.

The second operation performed on the second application information is used to trigger display of details about the second application. For example, the second operation may be an operation triggered on the icon or the name of the second application. A type of the second operation may include but is not limited to tapping, double-tapping, or touching and holding.

The second operation is an operation performed on the second application information on the second interface.

For example, the second operation performed on the second application information may be an operation triggered on the icon or the name of the application 21 on the user interface 13 mentioned in the embodiment in FIG. 3D or FIG. 3I; or the second operation performed on the second application information may be the operation 1 performed on the application 1 mentioned in the embodiment in FIG. 5A and FIG. 5B.

And/or, the second operation is an operation performed on the second application information on the third interface.

For example, the second operation performed on the second application information may be an operation triggered on the icon or the name of the application 21 on the user interface 14 mentioned m the embodiment in FIG. 3E or FIG. 3H; or the second operation performed on the second application information may be the operation 1 performed on the application 1 mentioned in the embodiment in FIG. 5A and FIG. 5B.

For a specific implementation of step 201, refer to the descriptions in the embodiment in FIG. 3D or FIG. 3I and the descriptions of S17 in the embodiment in FIG. 5A and FIG. 5B. Details are not described herein again.

Step 302: Display a fourth interface of the application market application in response to the second operation, where the fourth interface includes the details about the second application, the first tag type, the second tag type, the first application information, and sixth application information, the sixth application information includes a name and an icon of a sixth application, and a tag type of the sixth application is the second tag type The fourth interface is a user interface of the application market application. The fourth interface is used to display the details about the second application. A specific implementation of the fourth interface is not limited in this application. In addition, the third interface is different from the fourth interface.

The fourth interface may be the user interface 15 mentioned in the embodiment in FIG. 3F; or the fourth interface may be the details page of the application 1 mentioned in the embodiment in FIG. 5A and FIG. 5B. In other words, the fourth interface may be the details about the application 1 and the tag cluster application list in S21 mentioned in the embodiment in FIG. 5A and FIG. 5B.

For the details about the second application, refer to the descriptions of details about any application mentioned above.

For example, the details about the second application may be the details about the application 21 that are in the area 1171 and the area 1172 mentioned in the embodiment in FIG. 3F; or the details about the second application may be the details about the application 1 mentioned in the embodiment in FIG. 5A and FIG. 5B.

The sixth application information is information related to the sixth application, for example, the name and the icon of the sixth application. There may be one or more sixth applications. When there are a plurality of sixth applications, all tag types of the plurality of applications are the second tag type.

When the second interface is compared with the fourth interface, the first application information changes to the third application information, and content of the second application information does not change. In addition, a manner of displaying any piece of application information may change or may not change. This is not limited in this application.

When the second interface is compared with the fourth interface, content of the first application information does not change, and the second application information changes to the sixth application information. In addition, a manner of displaying any piece of application information may change or may not change. This is not limited in this application.

For example, the second tag type may be the children's game mentioned in the embodiments in FIG. 3D or FIG. 3I and FIG. 3E, the second application is the application 21 mentioned in the embodiments in FIG. 3D or FIG. 3I and FIG. 3E, and the sixth application is the application 22 mentioned in the embodiment in FIG. 3F, or the application 22 and the application 23. The first tag type may be the social game mentioned in the embodiments in FIG. 3D or FIG. 3I and FIG. 3E, and the first application is the application 11 mentioned in the embodiments in FIG. 3D or FIG. 3I and FIG. 3E, or the application 11 and the application 12.

For a specific implementation of step 202, refer to the descriptions in the embodiment in FIG. 3F and the descriptions of S21 in the embodiment in FIG. 5A and FIG. 5B. Details are not described herein again.

In conclusion, after receiving the operation of viewing any application in the second tag type on the second interface or the third interface, the electronic device may display, on the third interface, details about the application, the first tag type, the second tag type, and names and icons of one or more applications corresponding to each tag type.

Based on the description in the foregoing embodiments, three or more tag types and a name and an icon of each tag type may be displayed on one or more of the second interface, the third interface, and the fourth interface.

In addition to the foregoing content on each interface, the second interface, the third interface, and the fourth interface further include a third tag type and seventh application information. The seventh application information includes a name and an icon of a seventh application, a tag type of the seventh application is the third tag type, and the first tag type, the second tag type, and the third tag type are all different.

The third tag type is a tag type of an application. For the third tag type, refer to the descriptions of the foregoing tag types. The first tag type, the second tag type, and the third tag type are all different. In other words, an application corresponding to the first tag type, an application corresponding to the first tag type, and an application corresponding to the third tag type are usually different.

The first tag type, the second tag type, and the third tag type belong to a same category. Alternatively, the first tag type, the second tag type, and the third tag type belong to two or three categories. The third tag type may be displayed in a form of a text, a picture, a control, or the like.

For example, the third tag type may be the casual game mentioned in the embodiment in FIG. 3D or FIG. 3I, and the seventh application is the application 31 mentioned in the embodiment in FIG. 3D or FIG. 3I, or the application 31 and the application 32; or the third tag type may be the puzzle game mentioned in the embodiment in FIG. 3D or FIG. 3I, and the seventh application is the application 41 mentioned in the embodiment in FIG. 3D or FIG. 3I, or the application 41 and the application 42; or the third tag type may be the standalone game mentioned in the embodiment in FIG. 3D or FIG. 3I, and the seventh application is the application 51 mentioned in the embodiment in FIG. 3D or FIG. 3I, or the application 51 and the application 52, or the third tag type may be the standalone game mentioned in the embodiment in FIG. 3D or FIG. 3I, and the seventh application is the application 61 mentioned in the embodiment in FIG. 3D or FIG. 3I, or the application 61 and the application 62.

In this application, on a details page of an application, a tag type of the application is sorted at the top. Other tag types may be displayed based on the sorting on the result page of the search content.

Sorting of each tag type is related to a historical operation behavior of each tag type. In addition, the sorting of each tag type is further related to popularity of an application of each tag type. For an implementation process of sorting each tag type, refer to the descriptions of sorting the plurality of tag types by the server. Details are not described herein again.

Sorting of the plurality of tag types on the second interface is the same as sorting of the plurality of tag types on the third interface. Sorting of the plurality of tag types on the second interface is different from sorting of the plurality of tag types on the fourth interface.

In some embodiments, sorting of the first tag type, the second tag type, and the third tag type on each of the second interface and the third interface is first sorting. Sorting of the first tag type, the second tag type, and the third tag type on the fourth interface is second sorting.

The first sorting is that the first tag type is before the second tag type, and the second tag type is before the third tag type.

The second sorting is that the second tag type is before the first tag type, and the first tag type is before the third tag type.

That one tag type is before another tag type may be understood as that an area in which one label category is located is above/left of an area in which another label category is located.

For example, for a specific implementation of the foregoing content, refer to the descriptions in the embodiments in FIG. 3A to FIG. 3I. Details are not described herein again.

Based on the descriptions of the foregoing embodiments, when viewing an application of a specific tag type on the result page of the search content and/or on a details page of any application, the electronic device may recommend a plurality of applications of the tag type on an expanded page.

In some embodiments, the application recommendation method in this application may further include the following steps.

Step 401: Receive a third operation performed on the first tag type.

The third operation performed on the first tag type is used to trigger display of a plurality of applications corresponding to the first tag type. For example, the third operation may be an operation triggered on a text or a control of the first tag type. A type of the third operation may include but is not limited to tapping, double-tapping, or touching and holding.

For example, the third operation performed on the first tag type may be an operation triggered on the control 1054 or the control 1064 on the user interface 13 mentioned in the embodiment in FIG. 3D or FIG. 3I; or the first operation performed on the first application information may be an operation triggered on the control 1132 or the control 1142 on the user interface 14 mentioned in the embodiment in FIG. 3E.

For a specific implementation of step 401, refer to the descriptions in the embodiments in FIG. 3D, FIG. 3E, and FIG. 3I. Details are not described herein again.

Step 402: Display a fifth interface of the application market application in response to the third operation, where the fifth interface includes a first application recommendation list, the first application recommendation list includes a plurality of applications, and a tag type of each application is the first tag type.

The fifth interface is a user interface of the application market application. The fifth interface is used to display the plurality of applications corresponding to the first tag type. A specific implementation of the fifth interface is not limited in this application. For example, the fifth interface may be the user interface 16 mentioned in the embodiment in FIG. 3G.

For a specific implementation of step 402, refer to the descriptions in the embodiment in FIG. 3G. Details are not described herein again.

In conclusion, after receiving an operation of viewing any tag type on any one of the second interface, the third interface, or the fourth interface, the electronic device may display, on the fifth interface, a plurality of applications corresponding to the tag type.

In addition, the fifth interface further includes the first tag type and the second tag type. For example, the first tag type may be the control 1211 on the user interface 16 mentioned in the embodiment in FIG. 3G, and the second tag type may be the control 1212 or the control 1213 on the user interface 16 mentioned in the embodiment in FIG. 3G.

In some embodiments, after receiving an operation of viewing another tag type on the fifth interface corresponding to a tag type, the electronic device may display, on a sixth interface, a plurality of applications corresponding to the another tag type. In this way, switching between applications corresponding to different tag types is implemented.

In some embodiments, a feasible implementation of S102 may include the following steps.

Step 501: Send the search content to a server.

For a specific implementation of the server, refer to the descriptions of the server in the embodiments in FIG. 1 to FIG. 5A and FIG. 5B. For step 501, refer to the descriptions of S12 in the embodiment in FIG. 5A and FIG. 5B. Details are not described herein again.

Step 502: Receive the first tag type, the second tag type, the first application information, and the second application information from the server.

For specific implementations of the first tag type, the second tag type, the first application information, and the second application information, refer to the descriptions of the tag cluster application list in the embodiment in FIG. 5A and FIG. 5B. For step 502, refer to the descriptions of S15 in the embodiment in FIG. 5A and FIG. 5B. Details are not described herein again.

Step 503: Display the first tag type, the second tag type, the first application information, and the second application information on the second interface.

For step 503, refer to the descriptions of S16 in the embodiment in FIG. 5A and FIG. 5B. Details are not described herein again.

In conclusion, the electronic device may display, on the result page of the search content by interacting with the server, a plurality of tag types and a name and an icon of an application of each tag type.

For example, this application provides an application recommendation apparatus, including one or more modules configured to perform the application recommendation method in the foregoing embodiments.

For example, this application provides a communication system, including an electronic device and a server. For the communication system, refer to the foregoing descriptions of the communication system shown in FIG. 4. For the electronic device, refer to the foregoing descriptions of the electronic device shown in FIG. 1 to FIG. 6. For the server, refer to the foregoing descriptions of the server shown in FIG. 1 to FIG. 6.

For example, this application provides an electronic device, including a memory and a processor. The memory is configured to store program instructions. The processor is configured to invoke the program instructions in the memory, so that the electronic device performs the application recommendation method in the foregoing embodiments.

For example, this application provides a chip system. The chip system is applied to an electronic device including a memory, a display, and a sensor. The chip system includes a processor. When the processor executes computer instructions stored in the memory, the electronic device performs the application recommendation method in the foregoing embodiments.

For example, this application provides a computer-readable storage medium. The computer-readable storage medium stores a computer program. When the computer program is executed by a processor, an electronic device is enabled to implement the application recommendation method in the foregoing embodiments.

For example, this application provides a computer program product, including executable instructions. The executable instructions are stored in a readable storage medium. At least one processor of an electronic device may read the executable instructions from the readable storage medium, and the at least one processor executes the executable instructions, so that the electronic device implements the application recommendation method in the foregoing embodiments.

In the foregoing embodiments, all or some of the functions may be implemented by using software, hardware, or a combination of software and hardware. When software is used to implement embodiments, all or some of embodiments may be implemented in a form of a computer program product. The computer program product includes one or more computer instructions. When the computer program instructions are loaded and executed on the computer, all or some of the procedure or functions according to this application are generated. The computer may be a general-purpose computer, a dedicated computer, a computer network, or another programmable apparatus. The computer instructions may be stored in a computer-readable storage medium. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A person of ordinary skill in the art may understand that all or some of the procedures of the method in embodiments may be implemented by a computer program instructing related hardware. The program may be stored in a computer-readable storage medium. When the program is run, the procedures in the foregoing method embodiments may be performed. The foregoing storage medium includes any medium that can store program code, for example, a read-only memory (read-only memory, ROM), a random access memory (random access memory, RAM), a magnetic disk, or an optical disc.

What is claimed is:

1. A method applied to an electronic device, wherein the method comprises:

receiving search content input on a first interface of an application market application;

receiving, based on the search content, a first tag type and a second tag type associated with respective groups of applications;

displaying a second interface of the application market application in response to the search content, wherein the second interface comprises the first tag type, the second tag type, first application information, and second application information, and wherein the first application information comprises a first name of a first application, a first icon of the first application, and a control of the first application;

displaying, on the second interface, the first name, the first icon, the control in association with the first tag type, and the first application information within a cluster of applications associated with the first tag type;

receiving a first operation performed on the first application information on the second interface;

displaying a third interface of the application market application in response to the first operation, wherein the third interface comprises application details about the first application, the first tag type, the second tag type, third application information, and the second application information, wherein the third application information comprises a third name and a third icon of a third application, and wherein a tag type of the third application is the first tag type;

receiving a fourth operation performed on the control; and installing or updating the first application on the electronic device in response to the fourth operation, wherein the second application information comprises a second name and a second icon of a second application, wherein a tag type of the first application is the first tag type, wherein a tag type of the second application is the second tag type, and wherein the first tag type is different from the second tag type.

2. The method of claim 1, wherein the first tag type corresponds to a first group of applications associated with the search content, and wherein the second tag type corresponds to a second group of applications associated with is related to the search content, wherein the first application information corresponds to the first group of applications, and wherein the second application information corresponds to the second group of applications.

3. The method of claim 1, wherein the third interface further comprises fourth application information, wherein the fourth application information comprises a fourth name and a fourth icon of a fourth application, and wherein a tag type of the fourth application is the first tag type.

4. The method of claim 1, wherein the third interface further comprises fifth application information, wherein the fifth application information comprises a fifth name and a fifth icon of a fifth application, and wherein a tag type of the fifth application is the second tag type.

5. The method of claim 1, further comprising:

receiving a second operation; and displaying a fourth interface of the application market application in response to the second operation, wherein the fourth interface comprises application details about the second application, the first tag type, the second tag type, the first application information, and sixth application information, wherein the sixth application information comprises a sixth name and a sixth icon of a sixth application, and wherein a tag type of the sixth application is the second tag type.

6. The method of claim 5, wherein the second operation is performed on the second application information on the second interface.

7. The method of claim 5, wherein the second interface, the third interface, and the fourth interface further comprise a third tag type and seventh application information, wherein the seventh application information comprises a seventh name and a seventh icon of a seventh application, and wherein a tag type of the seventh application is the third tag type.

8. The method of claim 7, further comprising:

sorting the first tag type, the second tag type, and the third tag type on the second interface based on first sorting, wherein the first sorting is that the first tag type is before the second tag type and that the second tag type is before the third tag type; and sorting the first tag type, the second tag type, and the third tag type on the fourth interface based on second sorting, wherein the second sorting is that the second tag type is before the first tag type and that the first tag type is before the third tag type.

9. The method of claim 7, further comprising sorting the first tag type, the second tag type, and the third tag type on each of the second interface and the third interface based on first sorting, wherein the first sorting is that the first tag type is before the second tag type and that the second tag type is before the third tag type.

10. The method of claim 1, further comprising sorting each tag type based on a historical operation behavior of each tag type.

11. The method of claim 1, further comprising:

receiving a third operation performed on the first tag type; and displaying a fifth interface of the application market application in response to the third operation, wherein the fifth interface comprises a first application recommendation list, wherein the first application recommendation list comprises a plurality of applications, and wherein a tag type of each of the plurality of applications is the first tag type.

12. The method of claim 11, wherein the fifth interface further comprises the first tag type and the second tag type.

13. The method of claim 1, wherein displaying the second interface of the application market application in response to the search content comprises:

sending the search content to a server;

receiving the first tag type, the second tag type, the first application information, and the second application information from the server in response to the search content; and displaying the first tag type, the second tag type, the first application information, and the second application information on the second interface.

14. An electronic device, comprising:

a memory configured to store instructions; and one or more processors coupled to the memory and configured to execute the instructions to cause the electronic device to:

receive search content input on a first interface of an application market application;

receive, based on the search content, a first tag type and a second tag type associated with respective groups of applications;

display a second interface of the application market application in response to the search content, wherein the second interface comprises a first tag type, a second tag type, first application information, and second application information, and wherein the first application information comprises a first name of a first application, a first icon of the first application, and a control of the first application;

display, on the second interface, the first name, the first icon, and the control in association with the first tag type, and the first application information within a cluster of applications associated with the first tag type;

receive a first operation performed on the first application information on the second interface;

display a third interface of the application market application in response to the first operation, wherein the third interface comprises application details about the first application, the first tag type, the second tag type, third application information, and the second application information, wherein the third application information comprises a third name and a third icon of a third application, and wherein a tag type of the third application is the first tag type;

receive a fourth operation performed on the control; and install or update the first application on the electronic device in response to the fourth operation, wherein the second application information comprises a second name and a second icon of a second application, wherein a tag type of the first application is the first tag type, wherein a tag type of the second application is the second tag type, and wherein the first tag type is different from the second tag type.

15. The electronic device of claim 14, wherein the third interface further comprises fourth application information, wherein the fourth application information comprises a fourth name and a fourth icon of a fourth application, and wherein a tag type of the fourth application is the first tag type.

16. The electronic device of claim 14, wherein the third interface further comprises fifth application information, wherein the fifth application information comprises a fifth name and a fifth icon of a fifth application, and wherein a tag type of the fifth application is the second tag type.

17. The electronic device of claim 14, wherein the first tag type corresponds to a first group of applications associated with the search content, and wherein the second tag type corresponds to a second group of applications associated with the search content, wherein the first application information corresponds to the first group of applications, and wherein the second application information corresponds to the second group of applications.

18. The electronic device of claim 14, wherein the one or more processors is further configured to execute the instructions to cause the electronic device to:

receive a second operation; and display a fourth interface of the application market application in response to the second operation, wherein the fourth interface comprises application details about the second application, the first tag type, the second tag type, the first application information, and sixth application information, wherein the sixth application information comprises a sixth name and a sixth icon of a sixth application, and wherein a tag type of the sixth application is the second tag type.

19. The electronic device of claim 18, wherein the second operation is performed on the second application information on the second interface.

20. A non-transitory computer-readable storage medium comprising computer instructions that, when run on an electronic device, cause the electronic device to:

receive search content input on a first interface of an application market application;

receive, based on the search content, a first tag type and a second tag type associated with respective groups of applications;

display a second interface of the application market application in response to the search content, wherein the second interface comprises a first tag type, a second tag type, first application information, and second application information, and wherein the first application information comprises a first name of a first application, a first icon of the first application, and a control of the first application;

display, on the second interface, the first name, the first icon, and the control in association with the first tag type, and the first application information within a cluster of applications associated with the first tag type;

receive a first operation performed on the first application information on the second interface;

display a third interface of the application market application in response to the first operation, wherein the third interface comprises application details about the first application, the first tag type, the second tag type, third application information, and the second application information, wherein the third application information comprises a third name and a third icon of a third application, and wherein a tag type of the third application is the first tag type;

receive a fourth operation performed on the control; and install or update the first application on the electronic device in response to the fourth operation, wherein the second application information comprises a second name and a second icon of a second application, wherein a tag type of the first application is the first tag type, wherein a tag type of the second application is the second tag type, and wherein the first tag type is different from the second tag type.

\* \* \* \* \*